US 11,587,303 B2

(12) United States Patent
Gelbolingo

(10) Patent No.: US 11,587,303 B2
(45) Date of Patent: Feb. 21, 2023

(54) INFORMATION PROCESSING APPARATUS THAT GENERATES FILE NAMES OF IMAGE FILES

(71) Applicant: KYOCERA Document Solutions Inc., Osaka (JP)

(72) Inventor: Christian Gelbolingo, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 168 days.

(21) Appl. No.: 17/105,595

(22) Filed: Nov. 26, 2020

(65) Prior Publication Data
US 2021/0158070 A1    May 27, 2021

(30) Foreign Application Priority Data

Nov. 26, 2019    (JP) .............................. JP2019-213575

(51) Int. Cl.
*G06V 10/40*    (2022.01)
*G06K 9/62*    (2022.01)
*G06V 30/10*    (2022.01)

(52) U.S. Cl.
CPC ........... *G06V 10/40* (2022.01); *G06K 9/6217* (2013.01); *G06V 30/10* (2022.01)

(58) Field of Classification Search
CPC .............................. G06V 10/40; G06K 9/6217
See application file for complete search history.

(56) References Cited

U.S. PATENT DOCUMENTS

2007/0027911 A1*    2/2007    Hakala ..................... G06F 16/50
2019/0303701 A1*    10/2019    Kazume ................. G06V 20/62

FOREIGN PATENT DOCUMENTS

| JP | 2006-211261 A | 8/2006 |
| JP | 2011-155548 A | 8/2011 |

* cited by examiner

*Primary Examiner* — Edward Park
(74) *Attorney, Agent, or Firm* — Hawaii Patent Services; Nathaniel K. Fedde; Kenton N. Fedde

(57) ABSTRACT

Provided is an information processing apparatus that a user is able to acquire a file name the corresponds to content of a document image. In a case where the document image includes an image portion but does not include a character portion, a control unit uses a first learning model to acquire a classification name according to a characteristic of the image portion as a subject. In a case where a document image includes a character portion but does not include an image portion, the control unit uses a second learning model to acquire a classification name according to a character string included in the character portion as a subject. The control unit generates a file name including acquired subject as a file name of an image file.

4 Claims, 16 Drawing Sheets

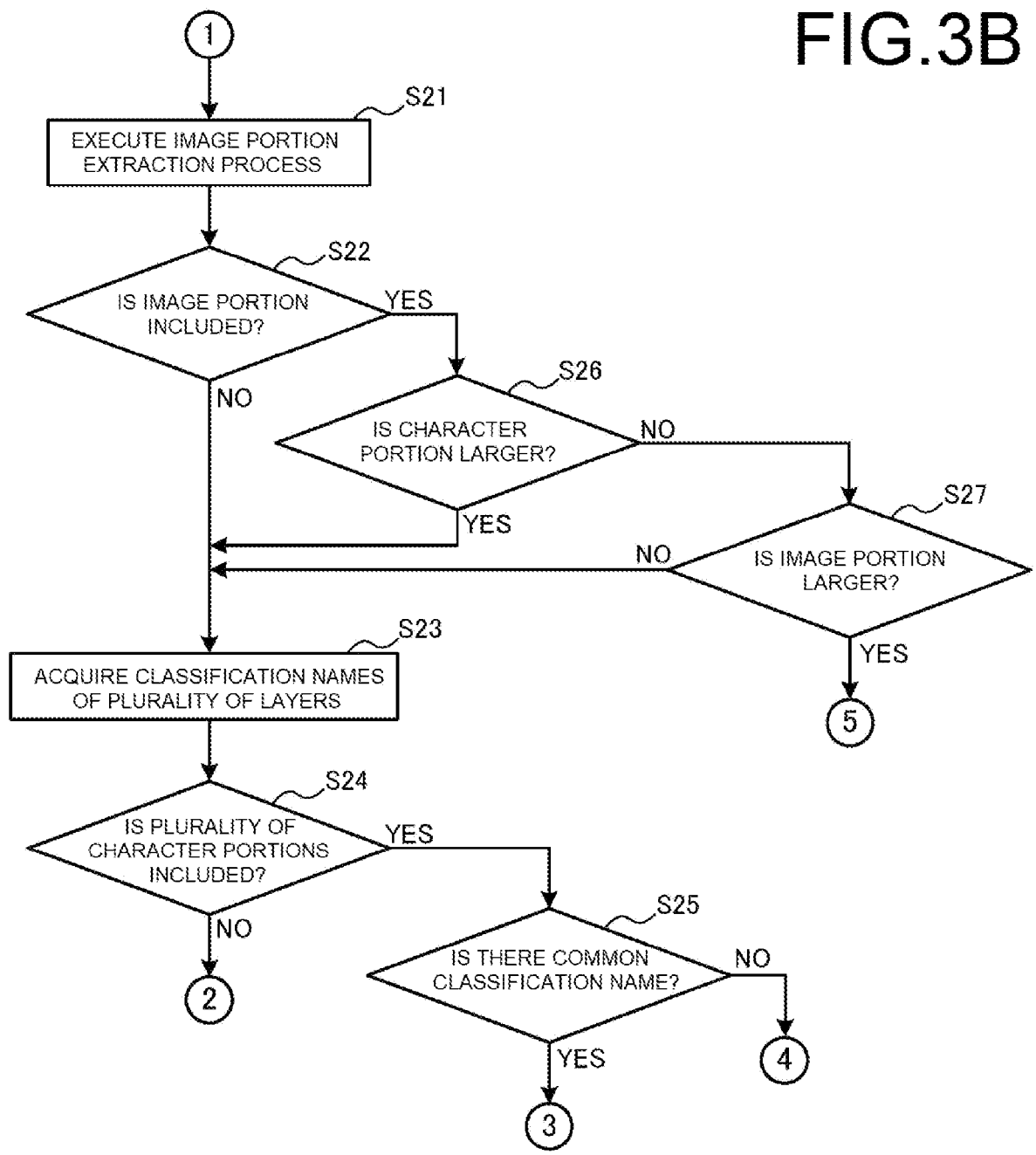

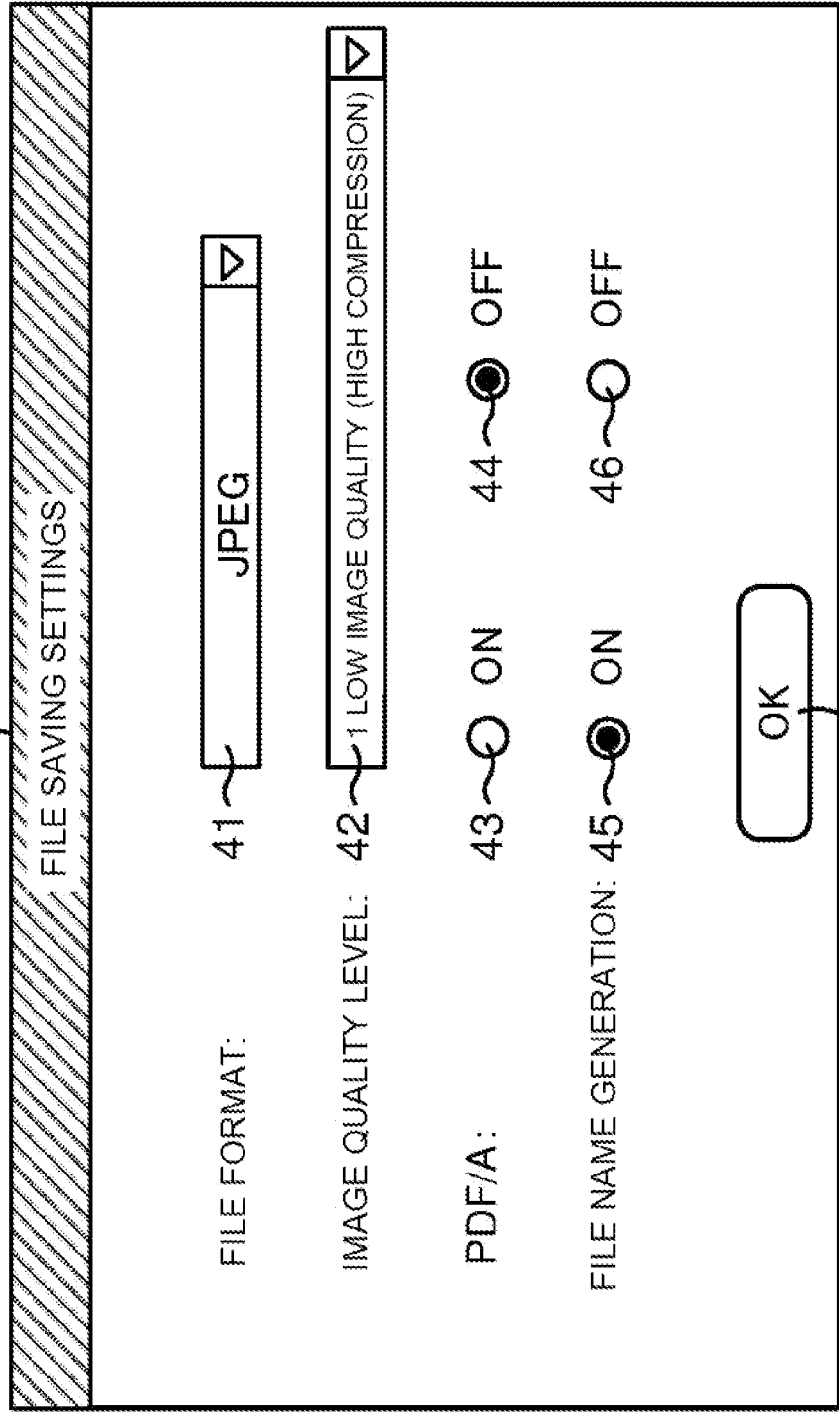

The sea, the world ocean or simply the ocean is the connected body of salty water that covers over 70% of Earth's surface (361,132,000 square kilometers (139,434,000 sq mi), with a total volume of roughly 1,332,000,000 cubic kilometres (320,000,000 cu mi).

91

93

92A

It moderates Earth's climate and has important roles in the water cycle, carbon cycle, and nitrogen cycle. It has been travelled and explored since ancient times, while the scientific study of the sea----oceanography---- dates broadly from the voyages of Captain James Cook to explore the Pacific ocean between 1768 and 1779.

92

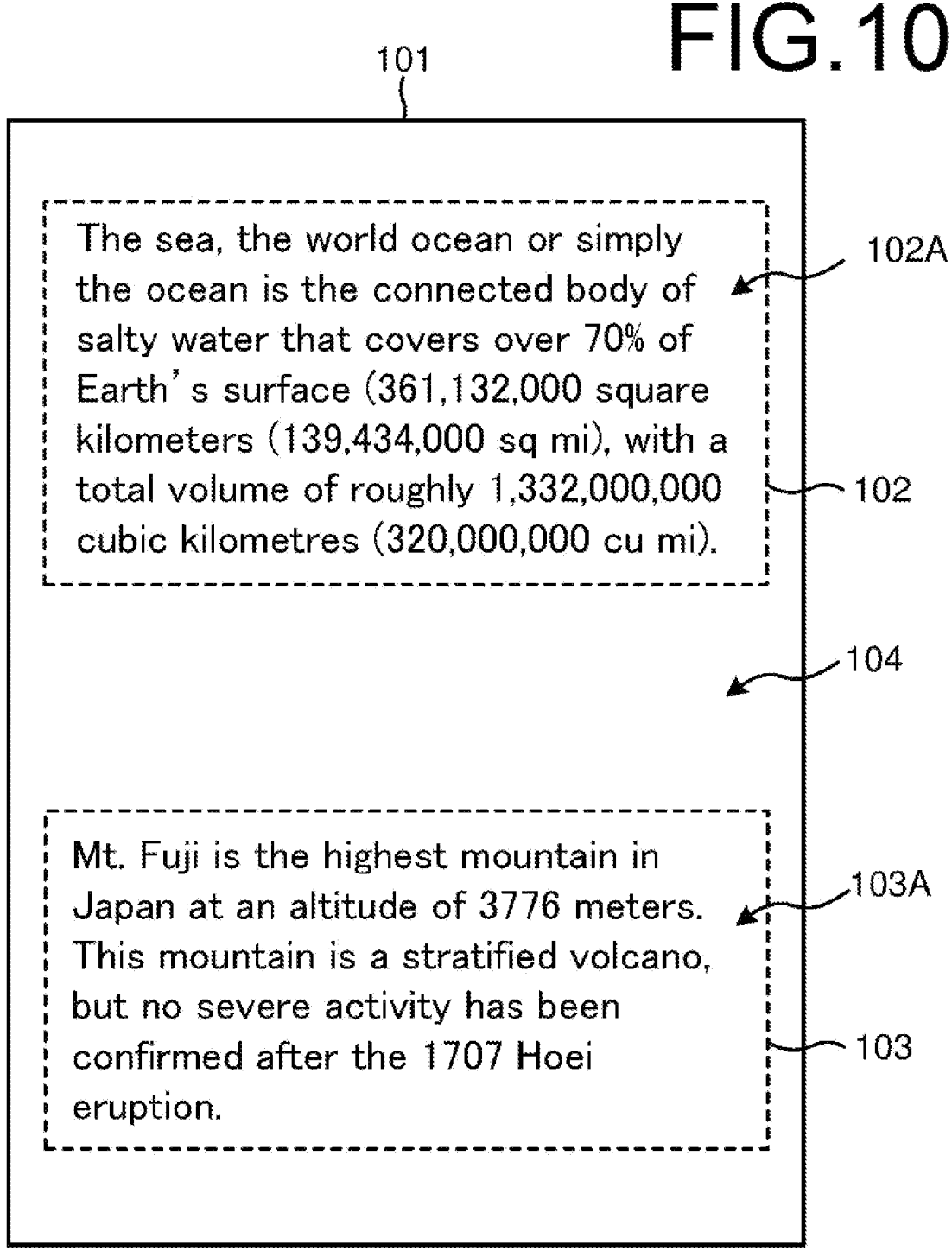

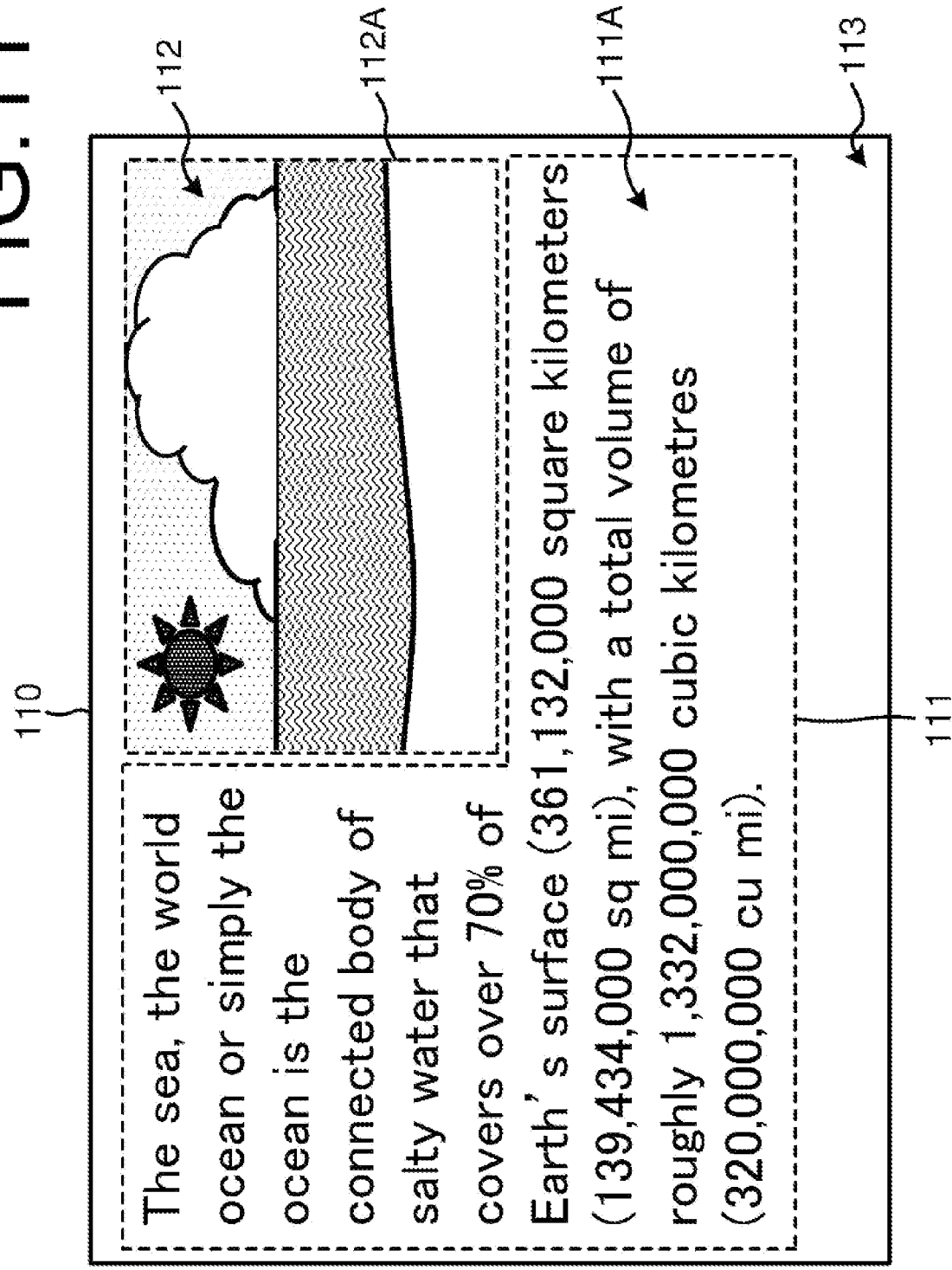

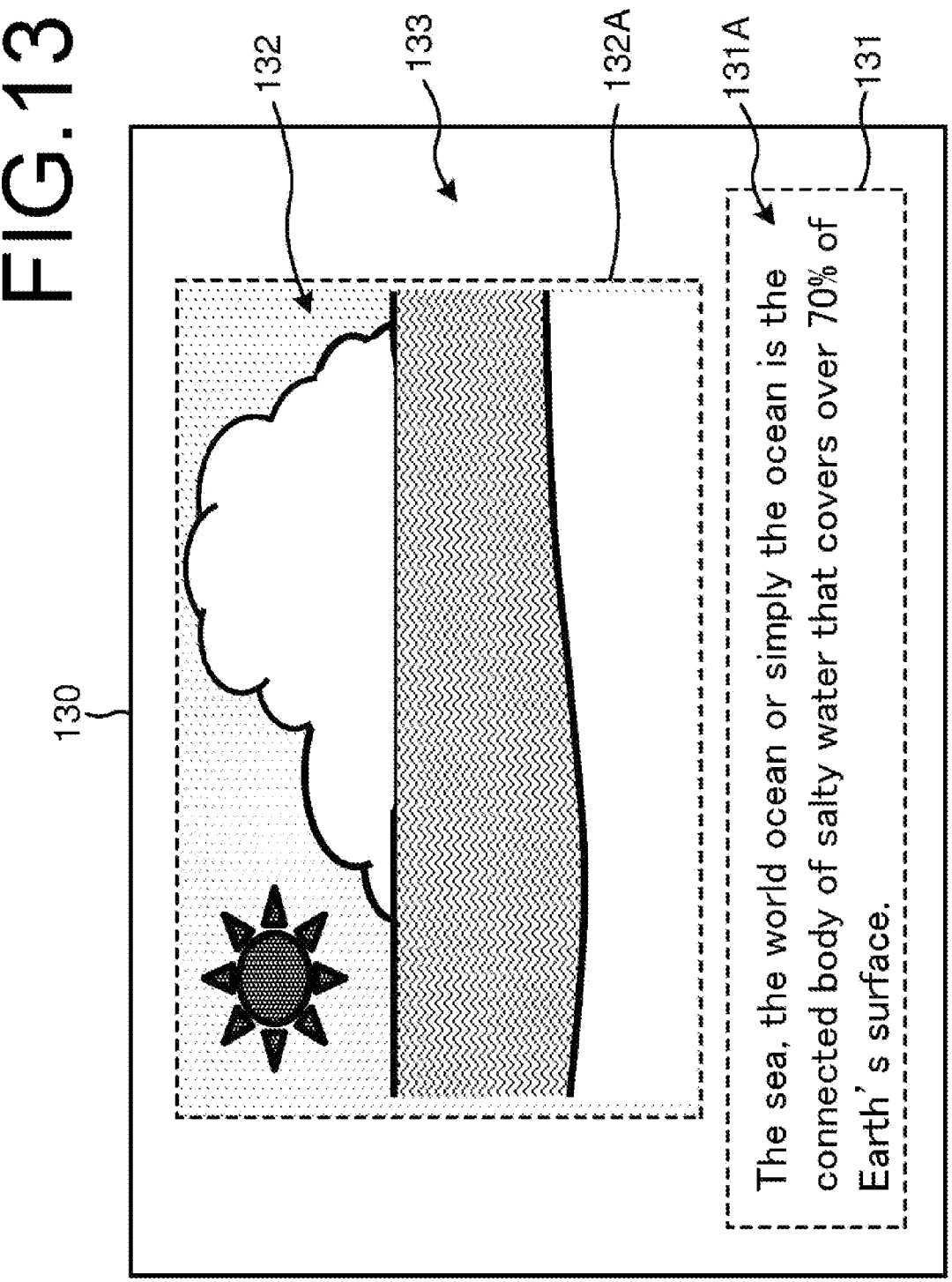

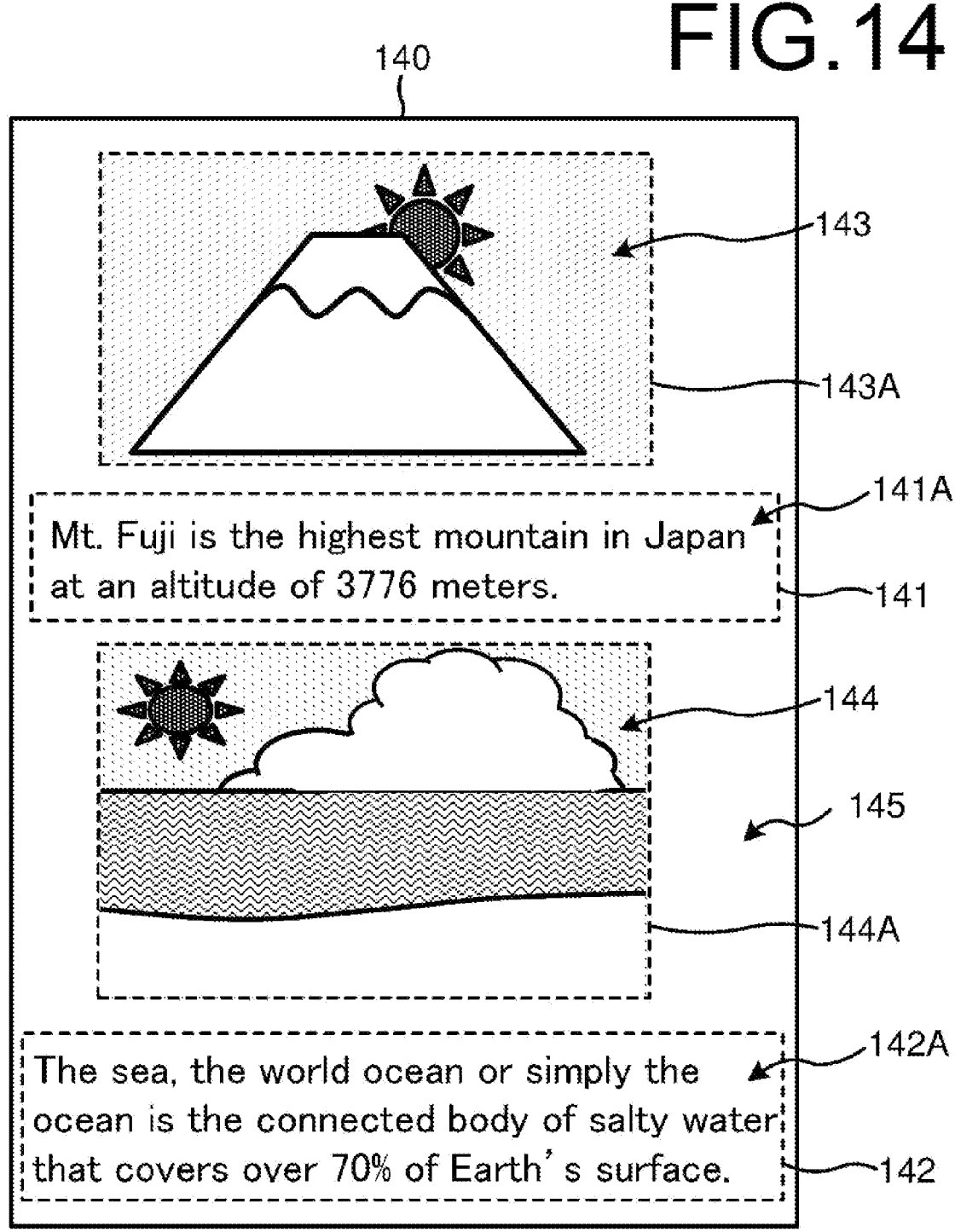

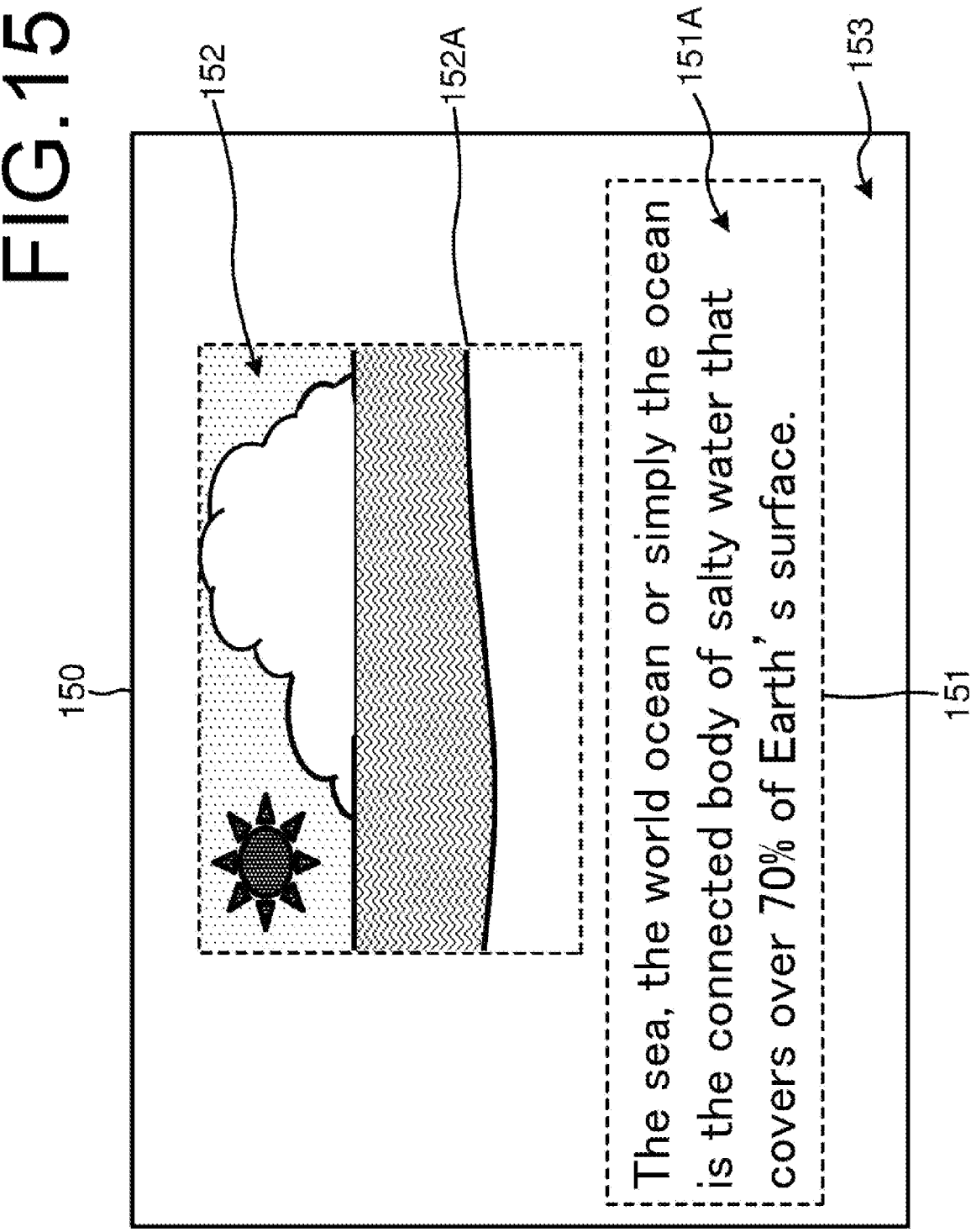

INFORMATION PROCESSING APPARATUS THAT GENERATES FILE NAMES OF IMAGE FILES

INCORPORATION BY REFERENCE

This application is based on and claims the benefit of priority from Japanese Patent Application No. 2019-213575 filed on Nov. 26, 2019, the contents of which are hereby incorporated by reference.

BACKGROUND

The present disclosure relates to an information processing apparatus, and more particularly to a technique for generating file names of image files.

A technique for generating a file name according to the contents of an image file is known. For example, as a typical technique, a technique is disclosed in which a character string having a high frequency of appearance is extracted from text data generated from a document image by an OCR (Optical Character Recognition) function, and the extracted character string is generated as a file name of an image file.

As another typical technique, a technique is disclosed in which from a character string indicated by text data generated from a document image by an OCR function, a character string that satisfies specified conditions such as font size, color, or the like for example, is identified, and the identified character string is generated as the file name of the image file.

SUMMARY

The information processing apparatus according to one aspect of the present disclosure includes a storage unit, an image input unit, and a control unit. The storage unit stores a first learning model and a second learning model in advance. The first learning model is trained in advance to output names according to characteristics of an inputted image. The second learning model is trained in advance to output names according to an inputted character string. An image file is inputted to the image input unit. The control unit acquires a subject corresponding to an image indicated by an image file inputted via the image input unit and generates a file name including acquired subject as a file name of the image file. In a case where an image indicated by the image file includes an image portion including a specified characteristic and does not include a character portion, the control unit uses the first learning model and acquires a name corresponding to the characteristic of the image portion as a subject. Moreover, in a case where an image indicated by the image file includes a character portion and does not include an image portion, the control unit uses the second learning model and acquires a name corresponding to a character string included in the character portion as a subject.

BRIEF DESCRIPTION OF THE DRAWINGS

FIG. 3B is a flowchart illustrating a file name generating process.

FIG. 4 is a diagram illustrating an example of a setting screen.

FIG. 9 is a diagram illustrating another example of a document image.

FIG. 10 is a diagram illustrating another example of a document image.

FIG. 11 is a diagram illustrating another example of a document image.

FIG. 13 is a diagram illustrating another example of a document image.

FIG. 14 is a diagram illustrating another example of a document image.

FIG. 15 is a diagram illustrating another example of a document image.

DETAILED DESCRIPTION

Figure 1:
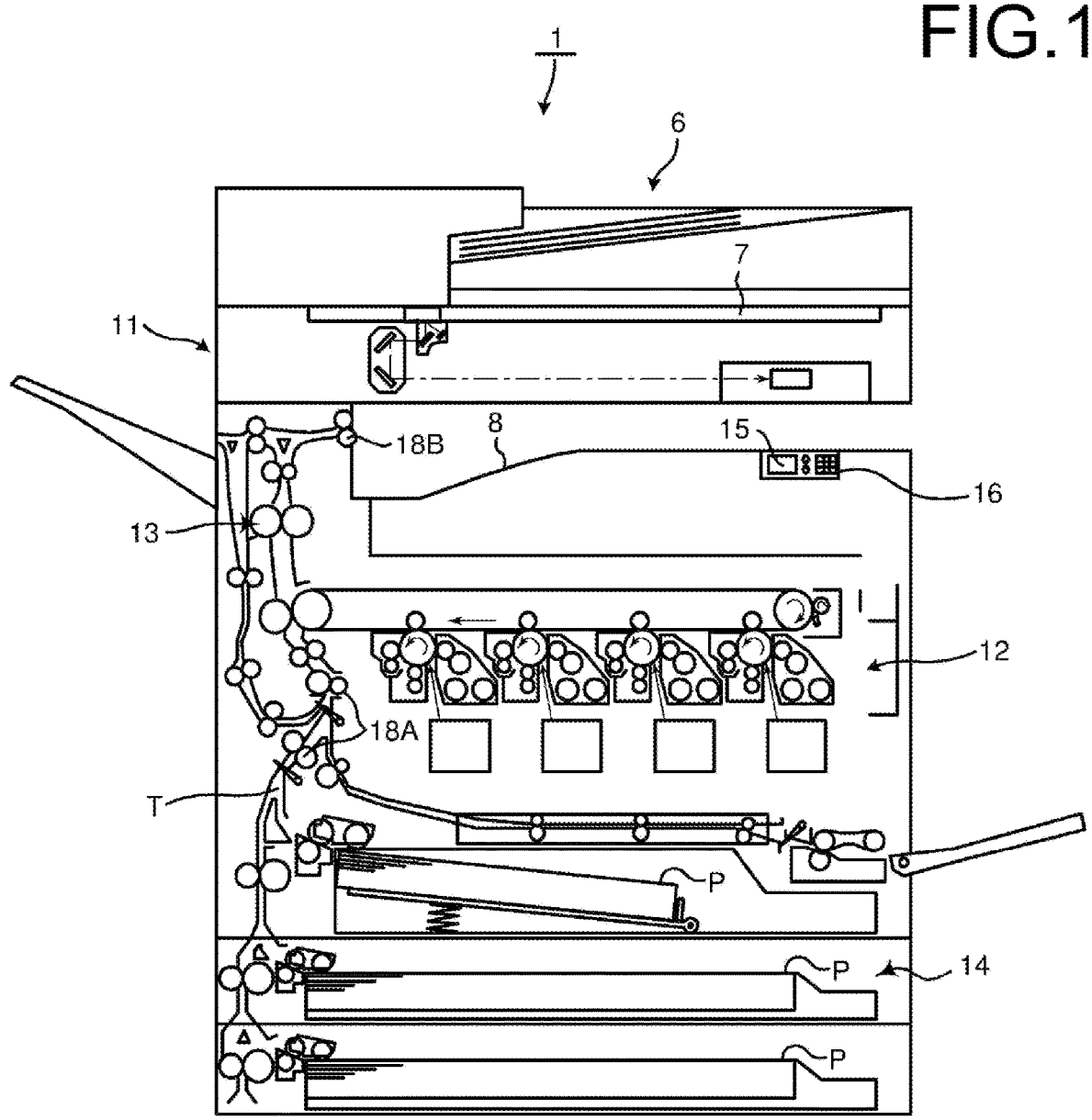
FIG. 1 is a front cross-sectional view illustrating a structure of an image forming apparatus of an embodiment according to the present disclosure.

In the following, an image forming apparatus as an information processing apparatus of an embodiment according to the present disclosure will be described with reference to the drawings. FIG. 1 is a front cross-sectional view illustrating a structure of an image forming apparatus of an embodiment according to the present disclosure. With reference to FIG. 1, the image forming apparatus 1 is a multifunction machine having a plurality of functions such as a copy function, a transmitting function, a printer function, a facsimile function and the like. The image forming apparatus 1 also has a file saving function for saving an image file.

Figure 2:
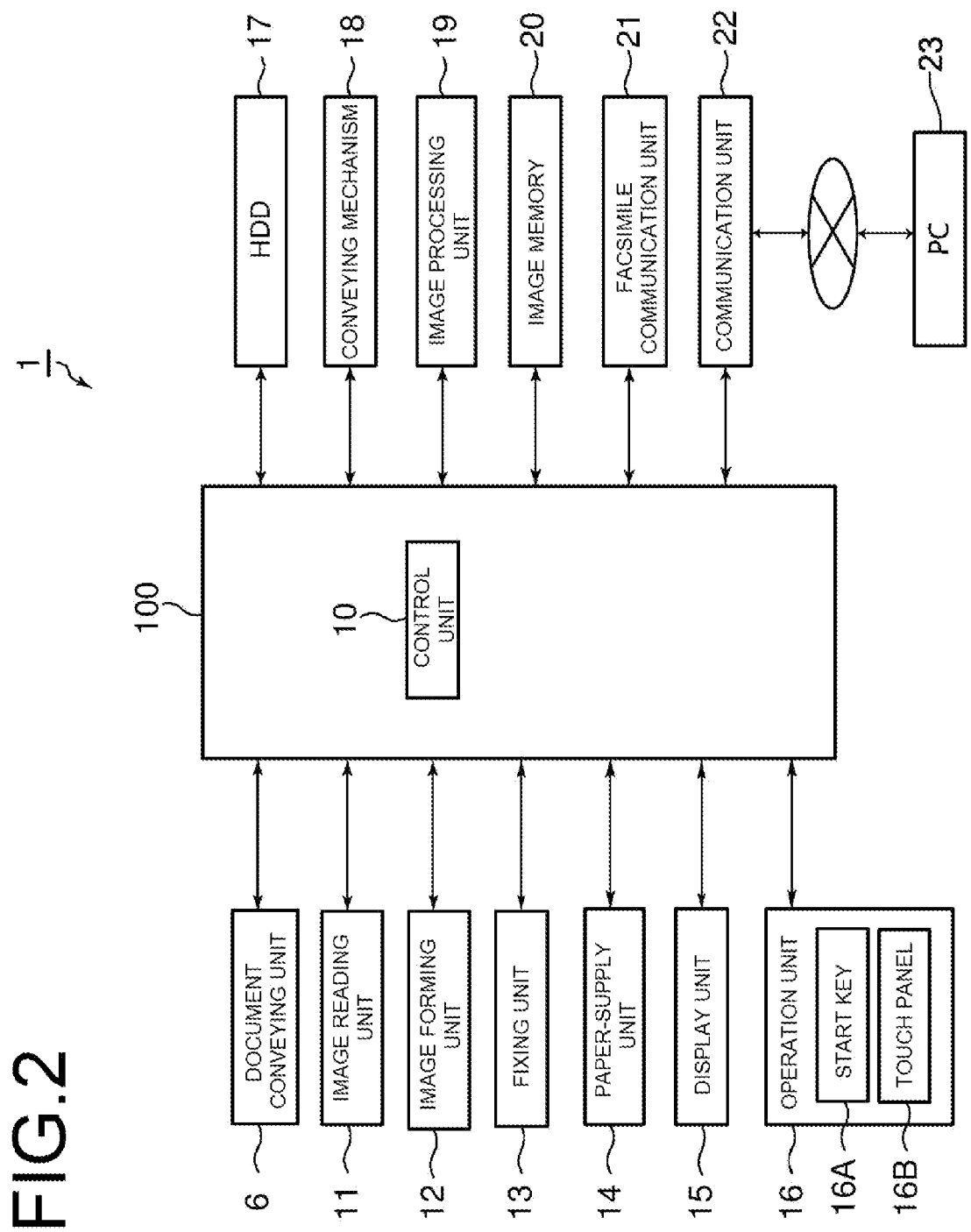
FIG. 2 is a block diagram illustrating an internal configuration of an image forming apparatus.

FIG. 2 is a block diagram illustrating an internal configuration of an image forming apparatus. With reference to FIG. 2, the housing of the image forming apparatus 1 houses a plurality of devices for realizing various functions of the image forming apparatus 1. For example, the housing houses an image reading unit 11, an image forming unit 12, a fixing unit 13, a paper-supply unit 14, and the like.

The image forming apparatus 1 includes a control unit 100. The control unit 100 includes a processor, a RAM (Random Access Memory), a ROM (Read Only Memory), and the like. The processor is, for example, a CPU (Central Processing Unit), an MPU (Micro Processing Unit), an ASIC (Application Specific Integrated Circuit), or the like.

The control unit 100 functions as a control unit 10 when the processor executes a control program stored in the ROM or on an HDD (Hard Disk Drive) 17. Note that the control unit 10 may be configured by a logic circuit regardless of the operation based on the control program above.

The control unit 10 performs the overall control of the image forming apparatus 1. More specifically, the control unit 10 controls the operation of each unit of the image forming apparatus 1, and controls communication with a PC (Personal Computer) 23 or the like connected via a network. The control unit 10 also, by operating according to a generation program described later, acquires a subject corresponding to an image indicated by an image file and executes a file name generating process for generating a file name including the acquired subject.

The control unit 100 is electrically connected to the image reading unit 11, the image forming unit 12, the fixing unit 13, the paper-supply unit 14, a display unit 15, an operation unit 16, an HDD 17, a conveying mechanism 18, an image processing unit 19, an image memory 20, a facsimile communication unit 21, a communication unit 22 and the like.

The image reading unit 11 is an ADF (Auto Document Feeder) that includes a document conveying unit 6 that conveys documents placed on the platen, and a scanner that optically reads documents conveyed by the document conveying unit 6 or the documents placed on the platen glass 7. The image reading unit 11 reads a document by irradiating light onto the document by way of a light irradiation unit and receiving the reflected light by way of a CCD (Charge-Coupled Device) sensor, and generates image data. The image reading unit 11 and the control unit 10 are examples of image input units that are within the scope of claims.

The image forming unit 12 includes a photosensitive drum, a charging device, an exposing device, a developing device, and a transferring device. The image forming unit 12, based on image data or the like generated by the image reading unit 11, forms an image composed of a toner image on recording paper P conveyed from the paper-supply unit 14.

The fixing unit 13 fixes the toner image on the recording paper P by heating and pressurizing the recording paper P on which the toner image is formed by the image forming unit 12. The recording paper P on which the toner image is fixed by the fixing unit 13 is discharged to the discharge tray 8.

The paper-supply unit 14 includes a manual feed tray and a plurality of paper-supply cassettes. The paper-supply unit 14 pulls out recording paper P housed in a paper-supply cassette or recording paper placed on the manual feed tray one by one, and supplies the paper to the image forming unit 12.

The display unit 15 is a display device composed of a liquid crystal display, an organic EL (Organic Light-Emitting Diode) display, or the like. The display unit 15 displays various screens for each function that can be executed by the image forming apparatus 1 under the control of the control unit 10.

The operation unit 16 includes a plurality of hard keys such as a start key 16A for instructing the start of execution of each process, and the like. The operation unit 16 also includes a touch panel 16B that is arranged so as to overlap the display unit 15. The user, via the operation unit 16, inputs various information such as instructions or the like for each function that can be executed by the image forming apparatus 1.

The HDD 17 is a large-capacity storage device for storing various data such as image files or the like generated by the image reading unit 11 and the control unit 10. The HDD 17 stores various control programs for achieving the general operation of the image forming apparatus 1. The HDD 17 stores, as one of various control programs, a generation program for executing the file name generating process according to an embodiment of the present disclosure.

The HDD 17 stores an OCR program for executing a general OCR process as one of various control programs. The control unit 10, by performing operation according to an OCR program, generates text data based on a character portion included in an image indicated by an image file.

The HDD 17 stores a machine learning model (hereinafter, referred to as a "first learning model") that has been trained in advance to output a plurality of layers of classification names according to the characteristics of an input image. Here, the characteristic of an image is a feature that can be recognized by a general image recognition process using a CNN (Convolutional Neural Network), and is, for example, a corner, a contour, a color, or the like.

The first learning model is not particularly limited; however, a model that has been trained using a large-scale image database so as to be able to output a classification name according to the characteristics of an input image may be used. Large-scale image databases, for example, have undergone machine-learning such as ImageNet datasets or the like in which a large number of image files are classified according to a plurality of layers of classification names. In the present embodiment, the classification name of the plurality of layers includes the classification name of the first layer indicating a minor classification and the classification name of the second layer indicating a major classification.

The HDD 17 stores a machine learning model (hereinafter, referred to as a "second learning model") that has been trained in advance to output a plurality of layers of classification names according to an inputted character string group. The second learning model is not particularly limited; however, for example, a model that is generated by learning a set of a character string groups such as word groups or the like for judging the meaning of a sentence, and multi-layered classification names attached to the character string groups by a neural network or the like may be used.

The conveying mechanism 18 is composed of a conveying roller pair 18A, a discharge roller pair 18B, and the like. The conveying mechanism 18 conveys the recording paper P along a conveying path T toward the discharge tray 8 set as the discharge destination.

The image processing unit 19, as necessary, executes image processing on the image data generated by the image reading unit 11. The image memory 20 includes an area for temporarily storing image data of an output target generated by the image reading unit 11. The facsimile communication unit 21 connects to a public line and transmits and receives image data via the public line.

The communication unit 22 includes a communication module such as a LAN (Local Area Network) board or the like. The image forming apparatus 1 performs data communication with a PC 23 or the like that is connected via a network via the communication unit 22.

A power source is connected to each unit of the image forming apparatus 1, and each unit of the image forming apparatus 1 operates by electric power that is supplied from this power source.

[Operation]

Figure 3A:
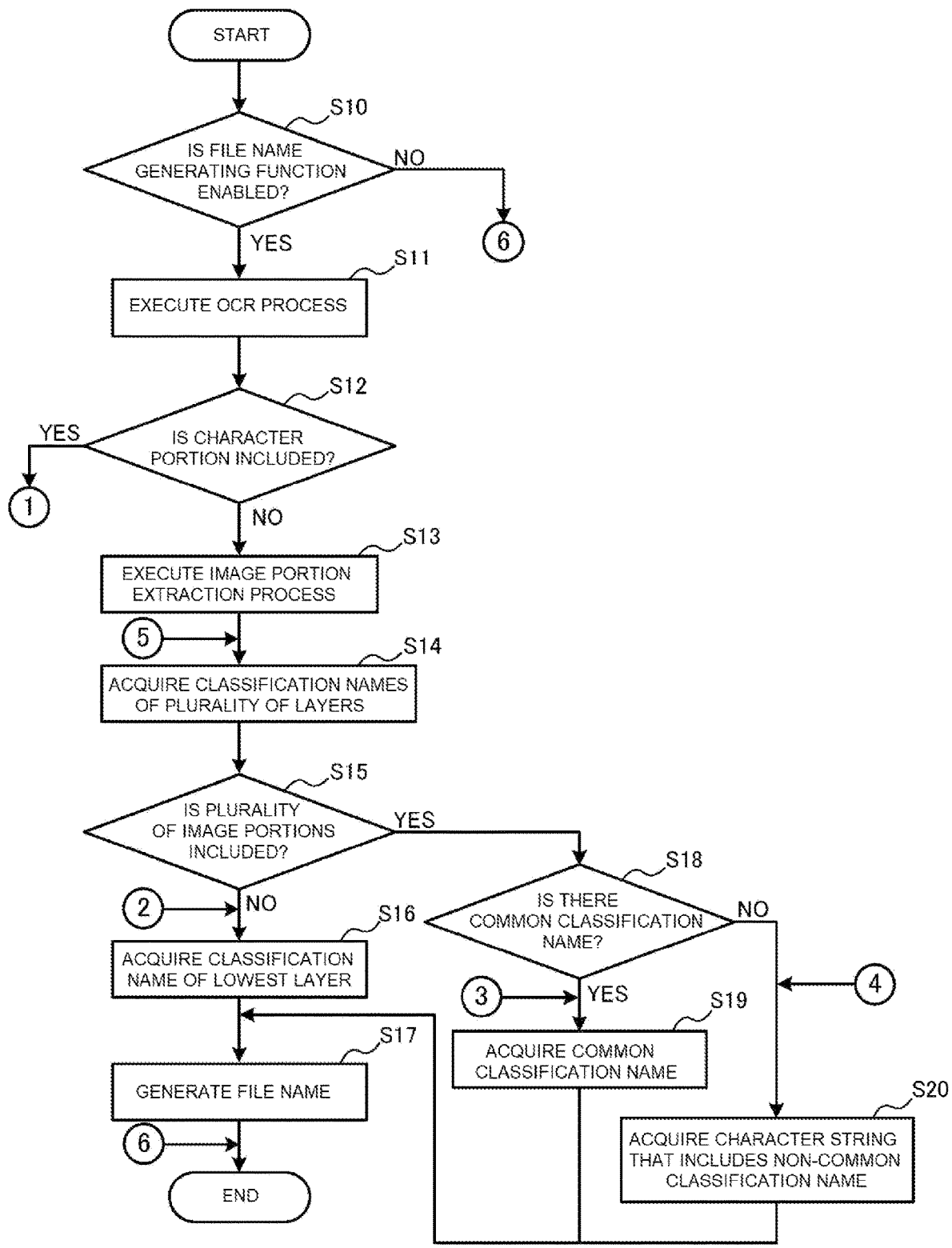
FIG. 3A is a flowchart illustrating a file name generating process.

FIGS. 3A and 3B are flowcharts illustrating a file name generating process. Hereinafter, the operation of the image forming apparatus 1 according to the present embodiment will be described with reference to FIGS. 3A and 3B. Note that in the following description, it is presumed that the image forming apparatus 1 is in a state where the power source is turned ON.

In the following, an image that is indicated by an image file (hereinafter, referred to as "document image") is presumed to include at least one of an image portion including a specified characteristic, and a character portion including a character string. The specified characteristic indicates a characteristic that can be recognized by the above-mentioned general image recognition process.

It is presumed that the user places a document on the platen glass 7 of the image reading unit 11 and inputs a display instruction for displaying a setting screen for setting the file saving function via the operation unit 16. When the control unit 10 receives the above-mentioned display instruction via the operation unit 16, the control unit 10 causes the display unit 15 to display the setting screen.

FIG. 4 is a diagram illustrating an example of a setting screen. With reference to FIG. 4, the control unit 10 causes an area 41 for displaying the format of an image file to be saved, and an area 42 for displaying the image quality level of an image file to be saved to be displayed on the setting screen 40. In this case it is presumed that by user input via the operation unit 16, the "JPEG (Joint photographic Experts Group)" format is selected as the image file format, and the image quality level is selected to be the highest compression rate level, or in other word, the lowest image quality level. The level with the lowest image quality is hereinafter referred to as "first low image quality level".

Therefore, the control unit 10 causes the character string "JPEG" indicating the JPEG format to be displayed in the area 41, and causes the character string "first low image quality (high compression)" indicating the first low image quality level to be displayed in the area 42. The control unit 10 also causes a radio button 43 for enabling a conversion setting for converting an image file to PDF/A format and a radio button 44 for disabling the conversion setting for converting an image file to PDF/A format to be displayed on the setting screen 40. In this case, the JPEG format is selected as the image file format, so the control unit 10 causes a check to be displayed on the radio button 44.

The control unit 10 further causes a radio button 45 for enabling the setting of the file name generation function and a radio button 46 for disabling the setting of the file name generation function to be displayed on the setting screen 40. In this case, it is presumed that the user touches the radio button 45. The control unit 10 detects a touch operation of the radio button 45 via the touch panel 16B, and causes a check to be displayed on the radio button 45.

After touching the radio button 45, it is presumed that the user touches a soft key 47 to confirm the setting content. When the control unit 10 detects a touch operation of the soft key 47 via the touch panel 16B, the control unit 10 sets the setting for the file saving function to the setting content reflected on the setting screen 40. In this case, the control unit 10 effectively sets the file name generation function.

After touching the soft key 47, it is presumed that the user inputs an execution instruction for executing the image file saving process via the operation unit 16 and presses the start key 16A. When the pressing of the start key 16A is detected, the control unit 10 causes the image reading unit 11 to read the document placed on the platen glass 7 and generate image data. The control unit 10 generates an image file in a set file format from the generated image data. In this case, the control unit 10 generates an image file in JPEG format.

With reference to FIG. 3A, when the image file is inputted to the image forming apparatus 1 by the image file being generated by the image reading unit 11 and the control unit 10, the control unit 10 starts executing the file name generating process. In the file name generating process, the control unit 10 first determines whether or not the file name generation function is effectively set (step S10). In this case, the control unit 10 determines that the file name generation function is effectively set (YES in step S10), and executes an OCR process on the document image (step S11).

After the processing of step S11, the control unit 10, based on the result of the OCR process, determines whether or not the document image includes a portion where text data is generated by the OCR process, or in other words, a character portion, (step S12).

Figure 5:
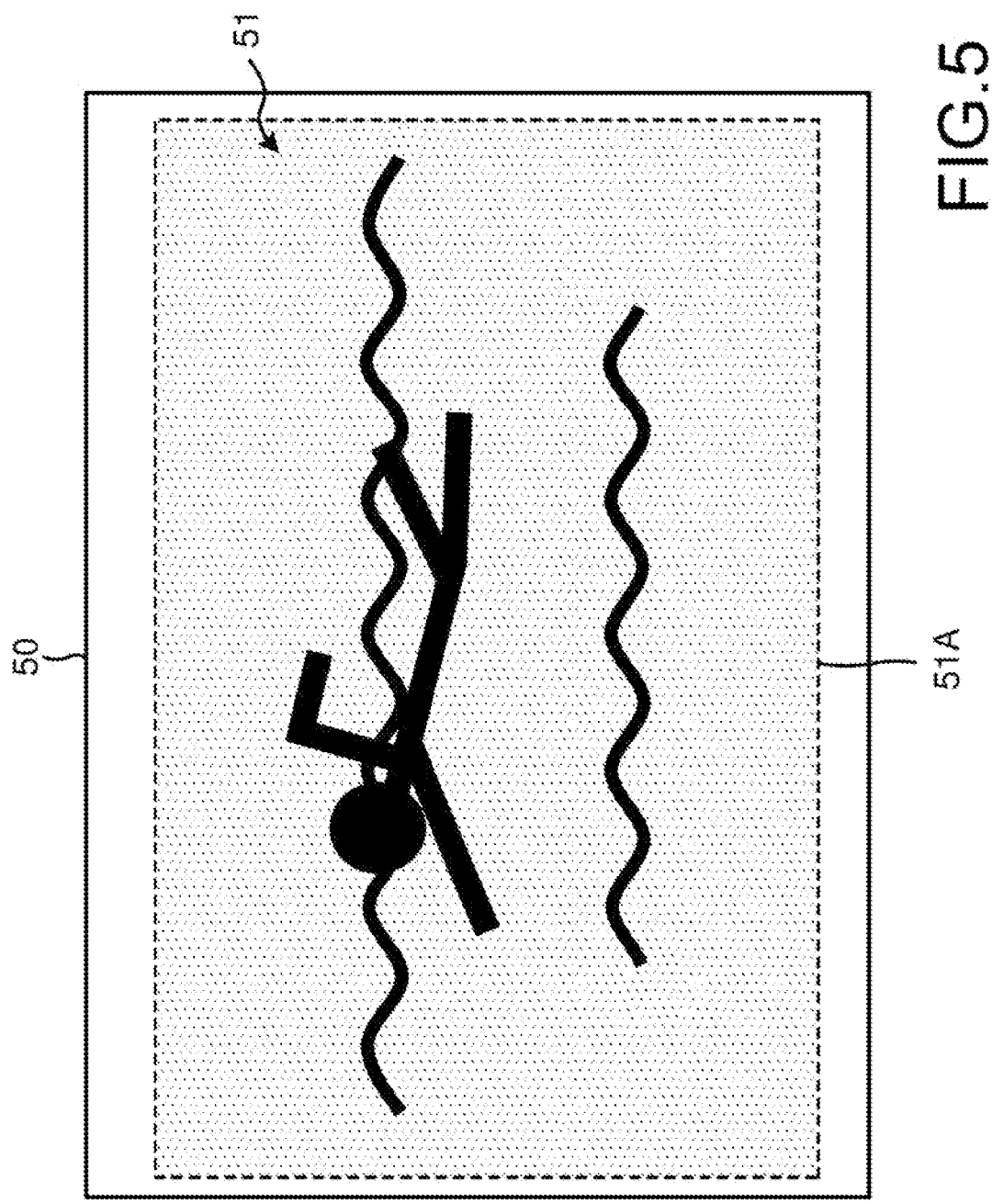
FIG. 5 is a diagram illustrating an example of a document image.

1) Case where the Document Image Includes an Image Portion and does not Include a Character Portion (1-1) Case where the Document Image Includes Only One Image Portion FIG. 5 is a diagram illustrating an example of a document image. With reference to FIG. 5, the document image 50 includes only an image portion 51 corresponding to a photograph of a person swimming in the sea and does not include a character portion.

In this case, the control unit 10 is not able to generate text data from the document image 50 by the OCR process, and therefore determines that the document image does not include a character portion (NO in step S12). Then, using a general shading edge detection technique, the control unit 10 detects an edge from the entire area of the document image, and executes a process for extracting the area surrounded by the detected edge as an image portion (step S13). This process is hereinafter referred to as an "image portion extraction process". In this case, by the image portion extraction process, the control unit 10 extracts the image surrounded by the edge 51A as the image portion 51 from the entire area of the document image 50.

After the processing of step S13, the control unit 10 uses the first learning model to acquire the classification names of a plurality of layers according to the characteristics of the extracted image portion for each image portion (step S14). More specifically, in step S14, the control unit 10 inputs any one of the extracted image portions to the first learning model. The control unit 10 acquires the classification names of a plurality of layers outputted from the first learning model in accordance to the input. The control unit 10 performs the processing described above on all of the extracted image portions.

In this case, the control unit 10 inputs the image portion 51 to the first learning model, and acquires the classification name of the first layer "Swimming" and the classification name of the second layer "Sea" that are outputted from the first learning model in response to the input. After the processing of step S14, the control unit 10, based on the extraction result of the image portion extraction process, determines whether or not the document image includes a plurality of image portions (step S15).

In this case, the control unit 10 extracts only the image portion 51 from the document image 50 by the image portion extraction process, so determines that the document image does not include a plurality of image portions (NO in step S15). Then, from the acquired classification names of the plurality of layers, the classification name of the lowest layer is acquired as the subject of the file name (step S16). In this case, the control unit 10 acquires the classification name of the first layer "Swimming" as the subject.

After the processing of step S16, the control unit 10 attaches, for example, a character string indicating the date when the start key 16A is pressed and an extension indicating the file format to the acquired subject, and generates a file name (step S17). In this case, the control unit 10 adds the character string "07292019" indicating that the date is Jul. 29, 2019 and the extension "jpg" indicating that the format is JPEG format to the subject "Swimming", and generate the file name "Swimming_07292019.jpg".

Figure 6:
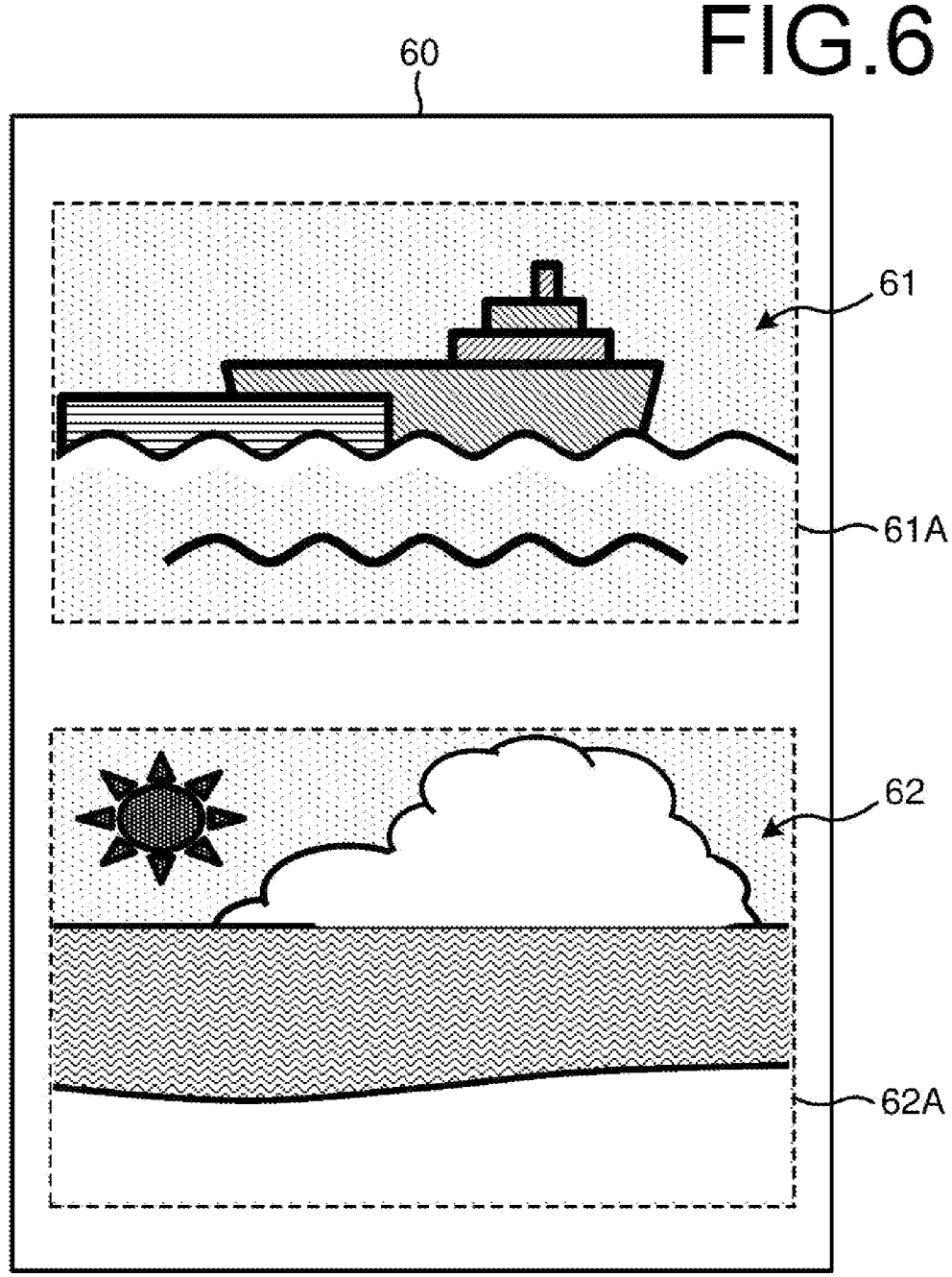
FIG. 6 is a diagram illustrating another example of a document image.

(1-2) Case where a Document Image Includes a Plurality of Image Portions (1-2-1) Case where the Classification Name is Common to a Plurality of Image Portions FIG. 6 is a diagram illustrating another example of a document image. With reference to FIG. 6, the document image 60 includes an image portion 61 corresponding to a photograph of a harbor and an image portion 62 corresponding to a photograph of the seaside, and does not include a character portion.

In this case, the control unit 10 is not able to generate text data from the document image 60 by the OCR process, and therefore determines that the document image does not include a character portion (NO in step S12). Then, the control unit 10 executes the process of step S13 described above, and from the entire area of the document image 60, extracts the image surrounded by the edge 61A as the image portion 61, and extracts the image surrounded by the edge 62A as the image portion 62.

After the processing of step S13, the control unit 10 executes the processing of step S14 described above. In this processing, the control unit 10 first inputs the image portion 61 to the first learning model, and acquires the classification name of the first layer "Harbor" and the classification name of the second layer "Sea" that are outputted from the first learning model in response to the input. The control unit 10 next inputs the image portion 62 to the first learning model, and acquires the classification name of the first layer "Seashore" and the classification name of the second layer "Sea" that are outputted from the first learning model in response to the input.

After the processing of step S14, the control unit 10 executes the processing of step S15 described above. In this case, the control unit 10 extracts the image portion 61 and the image portion 62 from the document image 60 by the image portion extraction process, so determines that the document image includes a plurality of image portions (YES in step S15). Then, the control unit 10 compares the classification names of the plurality of layers acquired for each image portion among the image portions, and it determines whether or not there is a classification name common to the plurality of image portions (step S18).

In this case, the classification name "Sea" is common to the image portion 61 and the image portion 62, so the control unit 10 determines that a common classification name exists (YES in step S18), and acquires the common classification name as the subject of the file name (step S19). After the processing of step S19, the control unit 10 executes the processing of step S17 described above, attaches the acquired subject to the character string "07292019" and the extension "jpg" to generate the file name "Sea_07292019.jpg".

Figure 7:
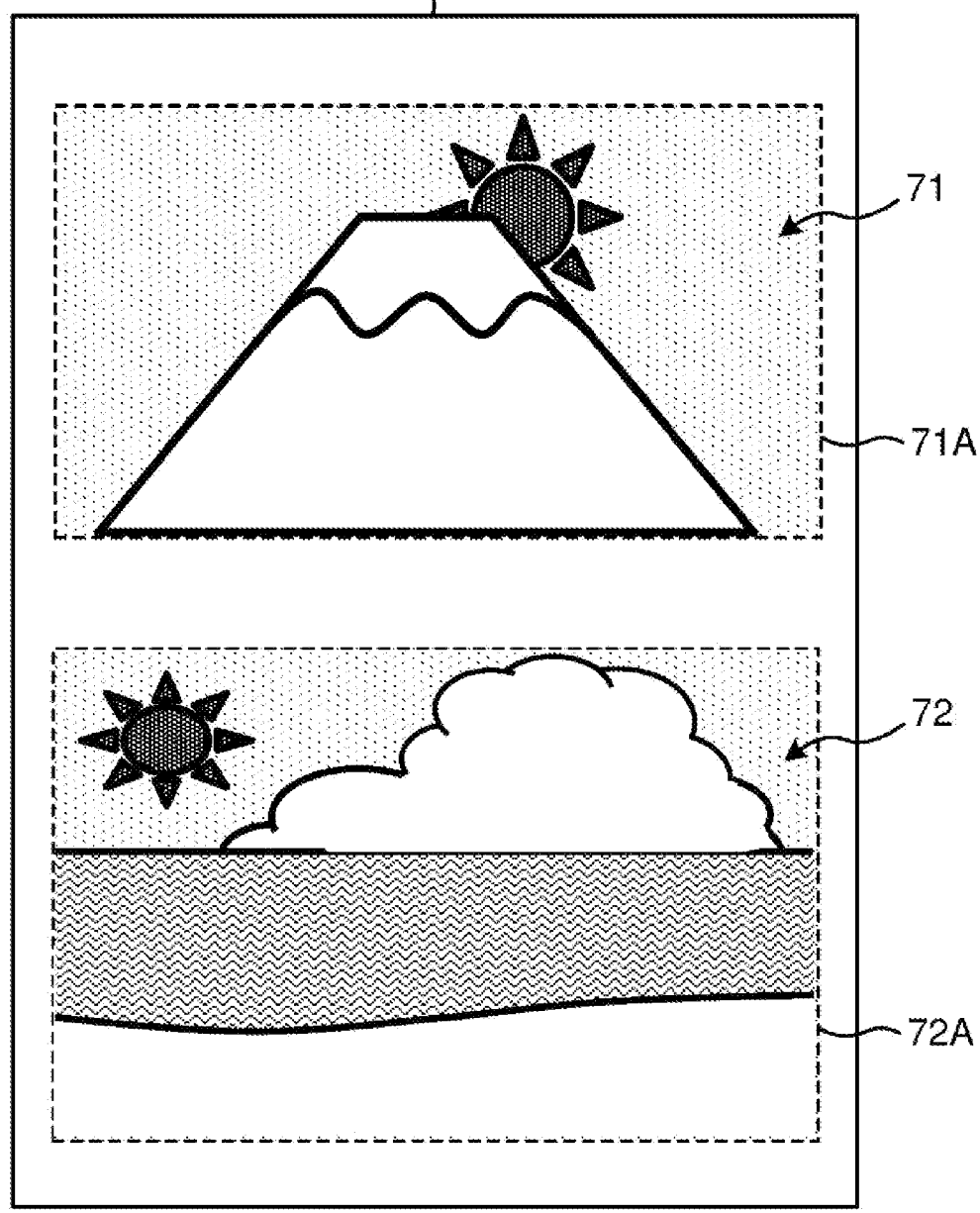
FIG. 7 is a diagram illustrating another example of a document image.

(1-2-2) Case where the Classification Name is not Common to a Plurality of Image Portions FIG. 7 is a diagram illustrating another example of a document image. With reference to FIG. 7, the document image 70 includes an image portion 71 corresponding to a photograph of a mountain and an image portion 72 corresponding to a photograph of the seaside, and it does not include a character portion.

In this case, the control unit 10 is not able to generate text data from the document image 70 by the OCR process, and therefore determines that the document image does not include a character portion (NO in step S12). Then, the control unit 10 executes the process of step S13 described above, and from the entire area of the document image 70, extracts the image surrounded by the edge 71A as the image portion 71, and extracts the image surrounded by the edge 72A as the image portion 72.

After the processing of step S13, the control unit 10 executes the processing of step S14 described above. In this process, the control unit 10 first inputs the image portion 71 to the first learning model and acquires the classification name of the first layer "Volcano" and the classification name of the second layer "Mountain" that are outputted from the first learning mode in response to the input. The control unit 10 next inputs the image portion 72 to the first learning model, and acquires the classification name of the first layer "Seashore" and the classification name of the second layer "Sea" that are outputted from the first learning model in response to the input.

After the processing of step S14, the control unit 10 executes the processing of step S15 described above. In this case, the control unit 10 extracts the image portion 71 and the image portion 72 from the document image 70 by the image portion extraction process, so determines that the document image includes a plurality of image portions (YES in step S15), and executes the processing of step S18 described above.

In this case, none of the classification names acquired for each image portion is common to the image portion 71 and the image portion 72, so the control unit 10 determines that a common classification name does not exist (NO in step S18). Then, a character string including all the classification names of the uppermost layer that are not common is generated and acquired as the subject of the file name (step S20). In this case, the control unit 10 generates the character string "Mountain_Sea" that includes the classification name "Mountain" and the classification name "Sea", and it acquires that character string as the subject of the file name.

After the processing of step S20, the control unit 10 executes the processing of step S17 described above, and attaches the character string "07292019" and the extension "jpg" to the acquired subject to generate the file name "Mountain_Sea_07292019".

Figure 8:
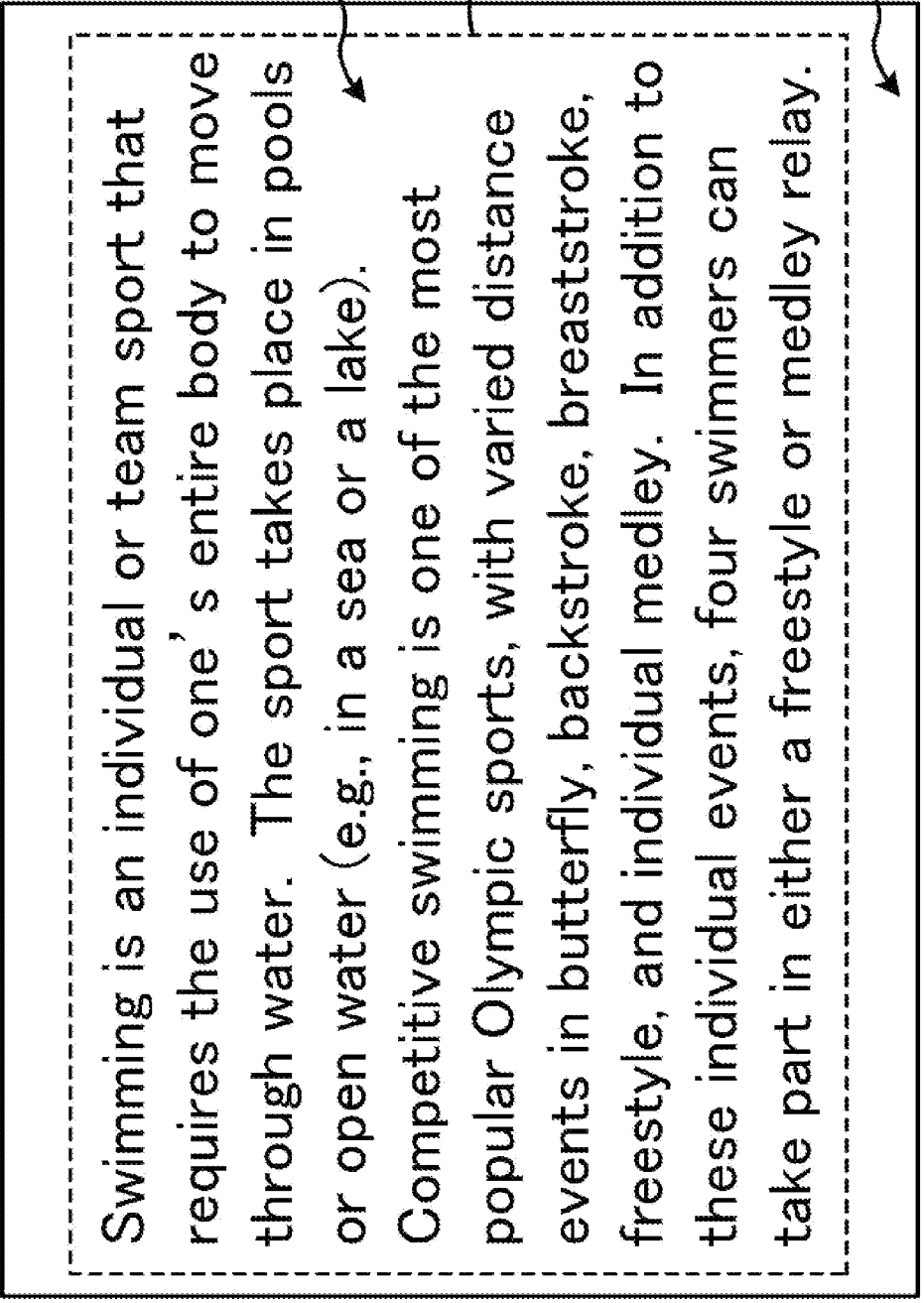
FIG. 8 is a diagram illustrating another example of a document image.

2) Case where the Document Image Includes a Character Portion and does not Include an Image Portion (2-1) Case where the Document Image Includes Only One Character Portion FIG. 8 is a diagram illustrating another example of a document image. With reference to FIG. 8, the document image 80 includes only the character portion 81 that includes the character string 81A giving a description of swimming, and does not include an image portion.

In this case, by the OCR process, the control unit 10 generates text data indicating the character string 81A from the document image 80, so determines that the document image includes a character portion (YES in step S12). Then, as illustrated in FIG. 3B, the control unit 10 executes an image portion extraction process for the area excluding the character portion in the document image (step S21). In this case, the control unit 10 executes the image portion extraction process on the area 82 excluding the character portion 81 in the document image 80.

After the processing of step S21, the control unit 10, based on the extraction result of the image portion extraction process, determines whether or not the document image includes an image portion (step S22). In this case, the control unit 10 is not able to extract the image portion from the area 82 by the image portion extraction process, and therefore determines that the document image does not include an image portion (NO in step S22). Then, using a second learning model, the classification names of a plurality of layers corresponding to the character strings included in the character portions are acquired for each character portion (step S23).

More specifically, in step S23, the control unit 10 extracts a plurality of words from the text data generated from any one of the character portions included in the document image, and inputs the extracted plurality of words to the second learning model as a character string group. The extraction of a plurality of words is performed, for example, by an information extraction process such as a named entity expression extraction process or the like using NLP (Natural Language Processing) technology. The control unit 10 acquires the classification names of a plurality of layers outputted from the second learning model in accordance to the input. The control unit 10 performs the above-described processing on all the character portions included in the document image.

In this case, the control unit 10 extracts the plurality of words "pools", "Olympic", "butterfly", "backstroke", "breaststroke", "freestyle", and "individual medley" from the text data indicating the character string 81A, and inputs the words to the second learning model as a character string group. Then, the control unit 10 acquires the classification name of the first layer "Swimming" and the classification name of the second layer "Sports", that are outputted from the second learning model in response to the input.

After the processing of step S23, the control unit 10 determines whether or not the document image includes a plurality of character portions (step S24). More specifically, in step S24, the control unit 10 acquires coordinate information indicating the position of the character portion in the document image for each character portion, and based on the acquired coordinate information, determines whether or not there are character portions that are separated from each other by a specified distance or more.

In a case where there are character portions separated from each other by a specified distance or more, the control unit 10 determines that the document image includes a plurality of character portions, and in other cases, determines that the document image does no include a plurality of character portions. The specified distance is not particularly limited; however, a length corresponding to the space between two lines is used here.

In this case, since the control unit 10 generates text data only from the character portion 81, so there are no character portions separated from each other by a specified distance or more. Accordingly, the control unit 10 determines that the document image does not include a plurality of character portions (NO in step S24), executes the processing of step S16 described above, and acquires the classification name of the first layer "Swimming" as a subject.

After the processing of step S16, the control unit 10 executes the processing of step S17 described above, attaches the acquired subject to the character string "07292019" and the extension "jPg" to generate the file name "Swimming_07292019.jpg".

(2-2) Case where a Document Image Includes a Plurality of Character Portions (2-2-1) Case where the Classification Name is Common to a Plurality of Character Portions FIG. 9 is a diagram illustrating another example of a document image. With reference to FIG. 9, the document image 90 includes a character portion 91 including a character string 91A that gives an explanation about the size of the sea, and a character portion 92 including a character string 92A that gives an explanation about the role of the sea, and does not include an image portion.

In this case, the control unit 10 generates text data indicating the character string 91A and generates text data indicating the character string 92A from the document image 90 by an OCR process, so determines that the document image includes a character portion (YES in step S12), and executes the processing of step S21 described above. In step S21, the control unit 10 executes the image portion extraction process on the area 93 that excludes the character portion 91 and the character portion 92 in the document image 90.

In this case, the control unit 10 is not able to extract an image portion from the area 93 by the image portion extraction process, so the control unit 10 determines that the document image does not include an image portion (NO in step S22), and executes the processing of step S23 described above. In step S23, the control unit 10 first extracts a plurality of words "sea", "world ocean", "ocean", "square", and "volume" from the text data indicating the character string 91A, and inputs the words to the second learning model as a character string group. Then, the control unit 10 acquires the classification name of the first layer "Size" and the classification name of the second layer "Sea", that are outputted from the second learning model in response to the input.

Next, the control unit 10 extracts a plurality of words "roles", "sea", "oceanography", and "Pacific ocean" from the text data indicating the character string 92A, and inputs the words to the second learning model as a character string group. Then, the control unit 10 acquires the classification name of the first layer "Role" and the classification name of the second layer "Sea", that are outputted from the second learning model in response to the input.

After the processing of step S23, the control unit 10 executes the processing of step S24 described above. In this case, it is presumed that the character portion 91 and the character portion 92 are separated by a length corresponding to the line spacing of three lines. Therefore, the document image 90 has character portions 91 and 92 that are separated from each other by a specified distance or more. In this case, the control unit 10 determines that the document image includes a plurality of character portions (YES in step S24), compares the classification names of the plurality of layers acquired for each character portion between the character portions, and determines whether or not there is a common classification name in the plurality of character portions (step S25).

In this case, the classification name "Sea" is common to the character portion 91 and the character portion 92, so the control unit 10 determines that a common classification name exists (YES in step S25). Then, the control unit 10 executes the processing of step S19 described above and acquires the common classification name "Sea" as the subject.

After the processing of step S19, the control unit 10 executes the processing of step S17 described above, attaches the acquired subject to the character string "07292019" and the extension "jpg" to generate the file name "Sea_07292019.jpg".

(2-2-2) Case where the Classification Name is not Common to a Plurality of Character Portions FIG. 10 is a diagram illustrating another example of a document image. With reference to FIG. 10, the document image 101 includes a character portion 102 including a character string 102A that gives an explanation about the size of the sea, and a character portion 103 including a character string 103A that gives an explanation about Mt. Fuji, and does not include an image portion.

In this case, the control unit 10 generates text data indicating the character string 102A and generates text data indicating the character string 103A from the document image 101 by an OCR process, so determines that the document image includes a character portion (YES in step S12), and executes the processing of step S21 described above.

In step S21, the control unit 10 executes the image portion extraction process on the area 104 that excludes the character portion 102 and the character portion 103 in the document image 101. In this case, the control unit 10 is not able to extract an image portion from the area 104 by the image portion extraction process, so the control unit 10 determines that the document image does not include an image portion (NO in step S22), and executes the processing of step S23 described above.

In step S23, the control unit 10 first extracts a plurality of words "sea", "world ocean", "ocean", "square", and "volume" from the text data indicating the character string 102A, and inputs the words to the second learning model as a character string group. Then, the control unit 10 acquires the classification name of the first layer "Size" and the classification name of the second layer "Sea", that are outputted from the second learning model in response to the input.

Next, the control unit 10 extracts a plurality of words "Mt. Fuji", "mountain", and "volcano" from the text data indicating the character string 103A and inputs the words into the second learning model as a character string group. Then, the control unit 10 acquires the classification name of the first layer "Volcano" and the classification name of the second layer "Mountain" output from the second learning model in response to the input.

After the processing of step S23, the control unit 10 executes the processing of step S24 described above. In this case, it is presumed that the character portion 102 and the character portion 103 are separated by a length corresponding to the line spacing of five lines. Therefore, in document image 101 there are character portions 102 and 103 that are separated from each other by a specified distance or more. In this case, the control unit 10 determines that the document image includes a plurality of character portions (YES in step S24), and executes the processing of step S25 described above.

In this case, neither of the classification names acquired for each character portion is common to the character portion 102 and the character portion 103, so the control unit 10 determines that a common classification name does not exist (NO in step S25), and executes the processing of step S20 described above. In this case, the control unit 10 generates a character string "Sea_Mountain" that includes the classification name "Sea" and the classification name "Mountain", and it acquires that character string as the subject.

After the processing of step S20, the control unit 10 executes the processing of step S17 described above. In this process, the control unit 10 attaches the character string "07292019" and the extension "jpg" to the acquired subject to generate the file name "Sea_Mountain_07292019.jpg".

(3) Case where the Document Image Includes a Character Portion and an Image Portion (3-1) Case where the Size of the Character Portion is Larger than the Size of the Image Portion (3-1-1) Case where the Document Image Includes One of Each a Character Portion and an Image Portion FIG. 11 is a diagram illustrating another example of a document image. With reference to FIG. 11, the document image 110 includes a character portion 111 including a character string 111A giving an explanation of the size of the sea, and an image portion 112 corresponding to a photograph of the seaside.

In this case, the control unit 10 generates text data indicating the character string 111A from the document image 110 by an OCR process, so determines that the document image includes a character portion (YES in step S12), and executes the processing of step S21 described above. In step S21, the control unit 10 executes the image portion extraction process on the area 113 that excludes the character portion 111 in the document image 110.

In this case, by way of the image portion extraction process, the control unit 10 extracts the image surrounded by the edge 112A from the area 113 as the image portion 112, and therefore determines that the document image includes an image portion (YES in step S22). Then, the control unit 10 determines whether or not the size of the character portion is larger than the size of the image portion (step S26).

More specifically, in step S26, the control unit 10 first calculates the sum of the area of all character portions (hereinafter referred to as a "first area") and calculates the sum of the area of all image portions (hereinafter referred to as a "second area") and calculates the sum of the first area and the second area (hereinafter referred to as a "third area"). Next, the control unit 10 calculates the ratio of the first area to the third area (hereinafter referred to as a "first ratio") and calculates the ratio of the second area to the third area (hereinafter referred to as a "second ratio") as percentages.

A case in which the first ratio is larger than the second ratio and the value indicating the difference between the first ratio and the second ratio exceeds a specified value will be described. In this case, the control unit 10 determines that the size of the character portion is larger than the size of the image portion, and in all other cases, determines that the size of the character portion is not larger than the size of the image portion. The specified value described above is not particularly limited; however, here, a value of "10%" is used.

In this case, the control unit 10 calculates the area of the character portion 111 as the first area and the area of the image portion 112 as the second area. Here, it is presumed that the control unit 10 calculates a value of "70%" as the first ratio and a value of "30%" as the second ratio. At this time, the value of the first ratio is larger than the value of the second ratio, and the value indicating the difference between the first ratio and the second ratio is "40%".

Accordingly, the control unit 10 determines that the size of the character portion is larger than the size of the image portion (YES in step S26), and executes the processing of step S23 described above. In this process, the control unit 10 extracts a plurality of words "sea", "world ocean", "ocean", "square", and "volume" from the text data indicating the character string 111A, inputs the words into the second learning model as a character string group, and acquires the classification name of the first layer "Size" and the classification name of the second layer "Sea" that are outputted from the second learning model according to the input.

After the processing of step S23, the control unit 10 executes the processing of step S24 described above. In this case, since the control unit 10 generates text data only from the character portion 111, so there are no character portions separated from each other by a specified distance or more. Accordingly, the control unit 10 determines that the document image does not include a plurality of character portions (NO in step S24), executes the processing of step S16 described above, and acquires the classification name of the first layer "Size" as the subject of the file name.

After the processing of step S16, the control unit 10 executes the processing of step S17 described above, and attaches character string "07292019" and the extension "jpg" to the acquired subject to generate the file name "Size_07292019.jpg".

Figure 12:
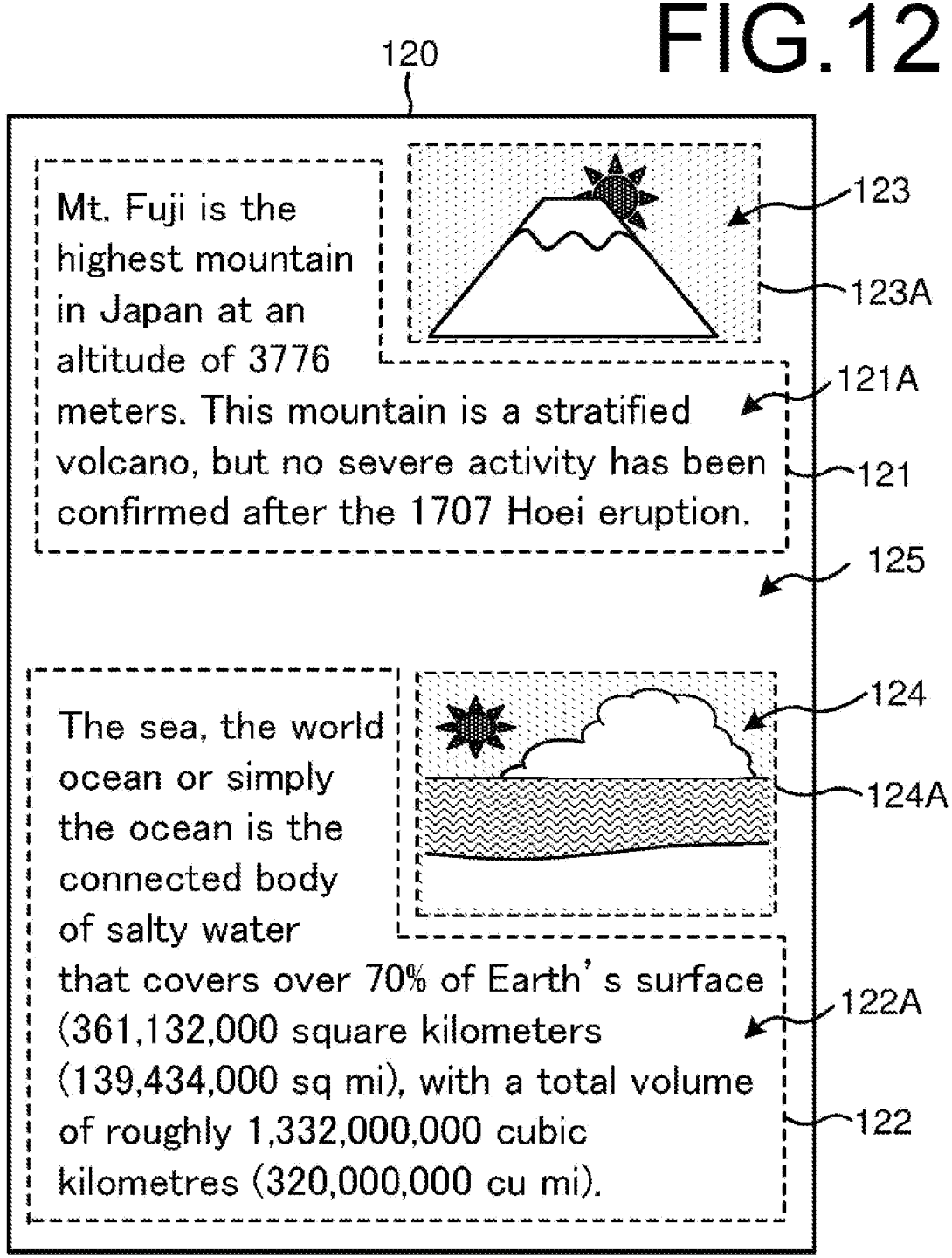
FIG. 12 is a diagram illustrating another example of a document image.

(3-1-2) Case where the Document Image Includes a Plurality of Character Portions and a Plurality of Image Portions FIG. 12 is a diagram illustrating another example of a document image. With reference to FIG. 12, the document image 120 includes a character portion 121 including a character string 121A that gives an explanation about Mt. Fuji, and a character portion 122 including a character string 122A that gives an explanation of the size of the sea. The document image 120 also includes an image portion 123 corresponding to a photograph of a mountain and an image portion 124 corresponding to a photograph of the seaside.

In this case, the control unit 10 generates text data indicating the character string 121A and generates text data indicating the character string 122A from the document image 120 by an OCR process, so determines that the document image includes a character portion (YES in step S12), and executes the processing of step S21 described above. In step S21, the control unit 10 executes the image portion extraction process on the area 125 that excludes the character portion 121 and the character portion 122 in the document image 120.

In this case, by the image portion extraction process, the control unit 10 extracts from the area 125 the image surrounded by the edge 123A as the image portion 123, and extracts the image surrounded by the edge 124A as the image portion 124. Therefore, the control unit 10 determines that the document image includes an image portion (YES in step S22), and executes the processing of step S26 described above.

In this case, in step S26, the control unit 10 calculates the sum of the area of the character portion 121 and the area of the character portion 122 as the first area, and calculates the sum of the area of the image portion 123 and the area of the image portion 124 as the second area. Here, it is presumed that the control unit 10 calculates a value of "80%" as the first ratio and calculates a value of "20%" as the second ratio. At this time, the value of the first ratio is larger than the value of the second ratio, and the value indicating the difference between the first ratio and the second ratio is "60%".

Accordingly, the control unit 10 determines that the size of the character portion is larger than the size of the image portion (YES in step S26), and executes the processing of step S23 described above. In this process, first, the control unit 10 extracts a plurality of words "Mt. Fuji", "mountain", and "volcano" from the text data indicating the character string 121A, inputs the words to the second learning model as a character string group, and acquires the classification name of the first layer "Volcano" and the classification name of the second layer "Mountain" outputted from the second learning model in response to the input.

Next, the control unit 10 extracts a plurality of words "sea", "world ocean", "ocean", "square", and "volume" from the text data indicating the character string 122A, and inputs the words to the second learning model as a character string group. Then, the control unit 10 acquires the classification name of the first layer "Size" and the classification name of the second layer "Sea", that are outputted from the second learning model in response to the input.

After the processing of step S23, the control unit 10 executes the processing of step S24 described above. In this case, it is presumed that the character portion 121 and the character portion 122 are separated by a length corresponding to the line spacing of three lines. Therefore, in document image 120 there are character portions 121, 122 that are separated from each other by a specified distance or more.

In this case, the control unit 10 determines that the document image includes a plurality of character portions (YES in step S24), and executes the processing of step S25 described above.

In this case, neither of the classification names acquired for each character portion is common to the character portion 121 and the character portion 122, so the control unit 10 determines that a common classification name does not exist (NO in step S25), and executes the processing of step S20 described above. In this case, the control unit 10 generates the character string "Mountain_Sea" that includes the classification name "Mountain" and the classification name "Sea", and acquires that character string as the subject of the file name.

After the processing of step S20, the control unit 10 executes the processing of step S17 described above, and attaches the character string "07292019" and the extension "jpg" to the acquired subject to generate the file name "Mountain_Sea_07292019".

(3-2) Case where the Size of the Image Portion is Larger than the Size of the Character Portion (3-2-1) Case where the Document Image Includes One of Each a Character Portion and an Image Portion FIG. 13 is a diagram illustrating another example of a document image. The document image 130 includes a character portion 131 including a character string 131A giving an explanation of the size of the sea, and an image portion 132 corresponding to a photograph of the seaside.

In this case, the control unit 10 generates text data indicating the character string 131A from the document image 130 by an OCR process, so determines that the document image includes a character portion (YES in step S12), and executes the processing of step S21 described above. In step S21, the control unit 10 executes the image portion extraction process on the area 133 that excludes the character portion 131 in the document image 130.

In this case, by way of the image portion extraction process, the control unit 10 extracts the image surrounded by the edge 132A from the area 133 as the image portion 132, and therefore determines that the document image includes an image portion (YES in step S22), and executes the processing of step S26 described above.

In this case, in step S26, the control unit 10 calculates the area of the character portion 131 as the first area, and calculates the area of the image portion 132 as the second area. Here, it is presumed that the control unit 10 calculates a value of "30%" as the first ratio and calculates a value of "70%" as the second ratio. At this time, the value of the second ratio is larger than the value of the first ratio, and the value indicating the difference between the first ratio and the second ratio is "400".

Therefore, the control unit 10 determines that the size of the character portion is not larger than the size of the image portion (NO in step S26), and determines whether or not the size of the image portion is larger than the size of the character portion (step S27). More specifically, a case will be described in which in step S27, the control unit 10 determines that the second ratio is larger than the first ratio, and that a value indicating the difference between the first ratio and the second ratio exceeds a specified value. In this case, the control unit 10 determines that the size of the image portion is larger than the size of the character portion, and in all other cases, determines that the size of the image portion is not larger than the size of the character portion.

In this case, the control unit 10 determines that the size of the image portion is larger than the size of the character portion (YES in step S27), executes the processing of step S14 described above, and inputs the image portion 132 into the first learning model. Then, the control unit 10 acquires the classification name of the first layer "Seashore" and the classification name of the second layer "Sea", that are outputted from the first learning model in response to the input.

After the processing of step S14, the control unit 10 executes the processing of step S15 described above. In this case, the control unit 10 extracts only the image portion 132 from the document image 130 by the image portion extraction process, so determines that the document image does not include a plurality of image portions (NO in step S15). Then, the control unit 10 executes the processing of step S16 described above and acquires the classification name of the first layer "Seashore" as the subject of the file name.

After the processing of step S16, the control unit 10 executes the processing of step S17 described above, and attaches the character string "07292019" and the extension "jpg" to the acquired subject to generate the file name "Seashore_07292019.jpg".

(3-2-2) Case where the Document Image Includes a Plurality of Character Portions and a Plurality of Image Portions FIG. 14 is a diagram illustrating another example of a document image. With reference to FIG. 14, the document image 140 includes a character portion 141 including a character string 141A that gives an explanation about Mt. Fuji, and a character portion 142 including a character string 142A that gives an explanation of the size of the sea. The document image 140 also includes an image portion 143 corresponding to a photograph of a mountain and an image portion 144 corresponding to a photograph of the seaside.

In this case, the control unit 10 generates text data indicating the character string 141A and text data indicating the character string 142A from the document image 140 by OCR process. Therefore, the control unit 10 determines that the document image includes a character portion (YES in step S12), and executes the processing of step S21 described above.

In step S21, the control unit 10 executes the image portion extraction process on the area 145 that excludes the character portion 141 and the character portion 142 in the document image 140. In this case, by the image portion extraction process, the control unit 10 extracts from the area 145 the image surrounded by the edge 143A as the image portion 143, and extracts the image surrounded by the edge 144A as the image portion 144. Therefore, the control unit 10 determines that the document image includes an image portion (YES in step S22), and it executes the processing of step S26 described above.

In this case, in step S26, the control unit 10 calculates the sum of the area of the character portion 141 and the area of the character portion 142 as the first area, and calculates the sum of the area of the image portion 143 and the area of the image portion 144 as the second area. Here, it is presumed that the control unit 10 calculates a value of "40%" as the first ratio and calculates a value of "60%" as the second ratio. At this time, the value of the second ratio is larger than the value of the first ratio, and the value indicating the difference between the first ratio and the second ratio is "20%".

Accordingly, the control unit 10 together with determining that the size of the character portion is not larger than the size of the image portion (NO in step S26), determines that the size of the image portion is larger than the size of the character portion (YES in step S27), and executes the processing of step S14 described above. In this process, the control unit 10 first inputs the image portion 143 to the first learning model and acquires the classification name of the first layer "Volcano" and the classification name of the second layer "Mountain" that are outputted from the first learning mode in response to the input.

The control unit 10 next inputs the image portion 144 to the first learning model, and acquires the classification name of the first layer "Seashore" and the classification name of the second layer "Sea" that are outputted from the first learning model in response to the input. After the processing of step S14, the control unit 10 executes the processing of step S15 described above. In this case, the control unit 10 extracts the image portion 143 and the image portion 144 from the document image 140 by the image portion extraction process, so determines that the document image includes a plurality of image portions (YES in step S15), and executes the processing of step S18 described above.

In this case, neither of the classification names acquired for each image portion is common to the image portion 143 and the image portion 144, so the control unit 10 determines that a common classification name does not exist (NO in step S18), and executes the processing of step S20 described above. In process, the control unit 10 acquires the character string "Mountain_Sea" that includes the classification name "Mountain" and the classification name "Sea" as the subject of the file name.

After the processing of step S20, the control unit 10 executes the processing of step S17 described above. In this process, the control unit 10 attaches the character string "07292019" and the extension "jpg" to the acquired subject to generate the file name "Mountain_Sea_07292019.jpg".

(3-3) Case where the Size of the Character Portion and the Size of the Image Portion are about the Same FIG. 15 is a diagram illustrating another example of a document image. With reference to FIG. 15, the document image 150 includes a character portion 151 including a character string 151A giving an explanation of the size of the sea, and an image portion 152 corresponding to a photograph of the seaside.

In this case, the control unit 10 generates text data indicating the character string 151A from the document image 150 by an OCR process, so determines that the document image includes a character portion (YES in step S12), and executes the processing of step S21 described above.

In step S21, the control unit 10 executes the image portion extraction process on the area 153 that excludes the character portion 151 in the document image 150. In this case, byway of the image portion extraction process, the control unit 10 extracts the image surrounded by the edge 152A from the area 153 as the image portion 152, and therefore determines that the document image includes an image portion (YES in step S22), and executes the processing of step S26 described above.

In this case, in step S26, the control unit 10 calculates the area of the character portion 151 as the first area, and calculates the area of the image portion 152 as the second area. Here, it is presumed that the control unit 10 calculates a value of "48%" as the first ratio and calculates a value of "52%" as the second ratio. At this time, the value of the second ratio is larger than the value of the first ratio, and the value indicating the difference between the first ratio and the second ratio is "40".

Accordingly, the control unit 10 together with determining that the size of the character portion is not larger than the size of the image portion (NO in step S26), determines that the size of the image portion is not larger than the size of the character portion (NO in step S27), and executes the processing of step S23 described above. In this process, the control unit 10 extracts a plurality of words "sea", "world ocean", "ocean", "70%", and "surface" from the text data indicating the character string 151A, inputs the words into the second learning model as a character string group, and acquires the classification name of the first layer "Size" and the classification name of the second layer "Sea" that are outputted from the second learning model according to the input.

After the processing of step S23, the control unit 10 executes the processing of step S24 described above. In this case, since the control unit 10 generates text data only from the character portion 151, so there are no character portions separated from each other by a specified distance or more. Accordingly, the control unit 10 determines that the document image does not include a plurality of character portions (NO in step S24), executes the processing of step S16 described above, and acquires the classification name of the first layer "Size" as a subject.

After the processing of step S16, the control unit 10 executes the processing of step S17 described above, and attaches character string "07292019" and the extension "jpg" to the acquired subject to generate the file name "Size_07292019.jpg".

After the processing of step S17, the control unit 10 ends the file name generating process. The control unit 10 attaches the file name generated by the file name generating process to the input image file, and stores the image file in the HDD 17.

Note that even in a case where the value of the first ratio is larger than the value of the second ratio and the value indicating the difference between the first ratio and the second ratio is equal to or less than a specified value, the control unit 10 executes a process similar to the example described above using FIG. 15.

In a case where the file name generation function is disabled, the control unit 10 determines that the file name generating process is not enabled (NO in step S10), and ends the filename generating process. In this case, the control unit 10 receives a file name that is inputted by the user via the operation unit 16, attaches the received file name to an image file, and stores the image file in the HDD 17.

According to the embodiment described above, in a case where the document image 50 includes an image portion 51 and does not include a character portion, the control unit 10 uses the first learning model to acquire a classification name according to the characteristic of the image portion 51 as a subject. In a case where the document image 80 includes a character portion 81 and does not include an image portion, the control unit 10 uses the second learning model to acquire a classification name according to a character string 81A included in the character portion 81 as a subject. The control unit 10 generates a file name including the acquired subject as a file name of the image file.

As a result, the user is able to acquire a file name according to the image portion even in a case where a character portion is not included in the document image. The user is also able to acquire a filename corresponding to a character portion even in a case, for example, where there is no character string that satisfies specified conditions such as font size, color or the like in the character portion of the document image.

Furthermore, according to the above embodiment, in the following cases, the control unit 10 acquires a classification name corresponding to the character string 111A included in the character portion 111 as a subject by using the second learning model. This is a case where the document image 110 includes the character portion 111 and the image portion 112, the size of the character portion 111 is larger than the size of the image portion 112, and the value indicating the difference between the size of the character portion 111 and the size of the image portion 112 exceeds a specified value.

In the following cases, the control unit 10 also uses the first learning model to acquire a classification name according to the characteristics of the image portion 132 as a subject. This is a case where the document image 130 includes the character portion 131 and the image portion 132, the size of the image portion 132 is larger than the size of the character portion 131, and the value indicating the difference between the size of the image portion 132 and the size of the character portion 131 exceeds a specified value.

As a result, the user is able to acquire a file name corresponding to the portion that occupies most of the document image. Accordingly, by confirming the file name, the user is able to more appropriately know the content of the document image.

Moreover, with the embodiment described above, in a case where the document image 60 includes a plurality of image portions 61, 62, and acquired classification names are common to the plurality of image portions 61, 62, the control unit 10 acquires the common classification names as a subject.

Moreover, in a case where the document image 70 includes a plurality of image portions 71, 72, and acquired classification names are not common to the plurality of image portions 71, 72, the control unit 10 acquires a character string that includes all of the uppermost layer classification names that are not common as a subject.

As a result, the user is able to acquire a file name corresponding to a plurality of image portions included in the document image. Accordingly, by confirming the file name, the user is able to more appropriately know the content of the document image.

Moreover, with the embodiment described above, in a case where the document image 90 includes a plurality of character portions 91, 92, and an acquired classification name is common to the plurality of character portions 91, 92, the control unit acquires the common classification name as a subject. Moreover, in a case where the document image 101 includes a plurality of character portions 102, 103, and acquired classification names are not common to the plurality of character portions 102, 103, the control unit 10 acquires a character string that includes all of the uppermost layer classification names that are not common as a subject.

As a result, the user is able to acquire a file name corresponding to a plurality of character portions included in the document image. Accordingly, by confirming the file name, the user is able to more appropriately know the content of the document image.

(First Modification)

In the embodiments described above, the control unit 10 determines whether or not the document image includes a character portion based on the result of an OCR process, and determines whether or not the document image includes an image portion based on the result of an image portion extraction process; however, the technique according to present disclosure is not limited to such embodiments. In a first modification, the control unit 10 performs the two determinations described above by performing template matching using a template image stored in advance in the HDD 17.

In this case, the control unit 10 executes the OCR process of step S11 immediately before the acquisition of the classification names using the second learning model, or in other words, immediately before the processing of step S23. Then, the image portion extraction process of step S13 or step S21 is executed immediately before the acquisition of the classification names using the first learning model, or in other words, immediately before the processing of step S14.

According to this first modification, in a case were the value indicating the difference between the size of the character portion 151 and the size of the image portion 152 is equal to or less than a specified value, the control unit 10 gives priority to the acquisition of the classification names using the second learning model. As a result, the file name may be generated without executing the image portion extraction process, which has a large load, and therefore the load on the control unit 10 maybe reduced.

(Other Modifications)

In the embodiments described above, the control unit 10 acquires classification names as a subject; however, the technique according to the present disclosure is not limited to such an embodiment. The control unit 10 may acquire, for example, a name such as a title or the like that appropriately indicates the content of the image portion or the content of the character portion as the subject.

In addition, in the embodiments described above, the control unit 10 acquires the classification name of the first layer and the classification name of the second layer as the classification names of the plurality of layers; however, the technique according to the present disclosure is not limited to such an embodiment. For example, the control unit 10 may acquire the classification name of a first layer indicating a minor classification, the classification name of a second layer indicating a middle classification, and the classification name of a third layer indicating a major classification.

Furthermore, in the embodiments described above, the image reading unit 11 and the control unit 10 function as an image input unit; however, the technique according to the present disclosure is not limited to such an embodiment. For example, the communication unit 22 may function as an image input unit. In this case, an image file that is transmitted from a PC 23 or the like connected via a network is inputted to the image forming apparatus 1 via the communication unit 22.

Moreover, in the embodiments described above, the control unit 10 attaches a character string indicating a date and an extension to a subject to generate a file name; however, the technique according to the present disclosure is not limited to such an embodiment. For example, the control unit 10 may generate a file name by attaching a character string indicating a serial number that indicates the order of generating the file name and an extension to a subject, or may generate a file name by attaching a character string indicating a date and time and an extension.

In addition, in the embodiments described above, the control unit 10 acquires the classification name of the lowest layer as the subject of the file name in step S16; however, the technique according to the present disclosure is not limited to such an embodiment. For example, the control unit 10 may acquire the classification name of the uppermost layer.

Furthermore, in the embodiments described above, the control unit 10, in step S20, generates a character string including all of the classification names of the uppermost layer that are not common; however, the technique according to the present disclosure is not limited to such an embodiment. For example, the control unit 10 may generate a character string including all of the classification names of the lowest layer that are not common.

Moreover, in the embodiments described above, in a case where the value indicating the difference between the size of the character portion 151 and the size of the image portion 152 is equal to or less than a specified value, the control unit 10 uses a second learning model to acquire classification names; however, the technique according to the present disclosure is not limited to such an embodiment. For example, the control unit 10 may also acquire the classification names using the first learning model in the above case.

Additionally, according to the embodiments described above, in a case where the document image includes a plurality of image portions (YES in step S15), the control unit 10 executes the processing of step S18 and the processing of step S19 or step S20; however, the technique according to the present disclosure is not limited to such an embodiment. For example, in case where the document image includes a plurality of image portions (YES in step S15), the control unit 10 may acquire the classification names of the lowest layer or the uppermost layer according to the image portion having the largest size as a subject.

Additionally, according to the embodiments described above, in a case where the document image includes a plurality of character portions (YES in step S24), the control unit 10 executes the processing of step S25 and the processing of step S19 or step S20; however, the technique according to the present disclosure is not limited to such an embodiment. For example, in case where the document image includes a plurality of character portions (YES in step S24), the control unit 10 may acquire the classification names of the lowest layer or the uppermost layer according to the character portion having the largest size as a subject.

Furthermore, in the embodiments described above, in step S26, the control unit 10 calculates the sum of the areas of all the character portions as a first area and the calculates the sum of the areas of all the image portions as a second area; however, the technique according to the present disclosure is not limited to such an embodiment. For example, the control unit 10 may calculate the area of the character portion having the largest size as the first area and calculate the area of the image portion having the largest size as the second area.

In addition, in the embodiments described above, after the processing of step S17, the control unit 10 stores the image file to which a generated file name is a attached in the HDD 17; however, the technique according to the present disclosure is not limited to such an embodiment. For example, in a case where the control unit 10 receives an execution instruction for executing a transmission process for transmitting the image file via the operation unit 16, the control unit 10 may transmit the image file with the generated file name to a specified transmission destination via the operation unit 16.

Moreover, in the embodiments described above, as the second learning model, the HDD 17 stores a model that has been pre-learned so as to output the classification names of a plurality of layers according to an inputted character string; however, the technique according to the present disclosure is not limited to such an embodiment. For example, as the second learning model, the HDD 17 may store a topic model using LDA (Latent Dirichlet Allocation), or in other words, using the latent Dirichlet allocation method. In this case, the control unit 10 uses the topic model above to acquire the main topic corresponding to the character string included in the character portion as the subject.

In a case where the topic model above is used as the second learning model, preferably the HDD 17 further correlates a template for outputting a subject corresponding to a character string included in a document image such as a receipt, business card, list or the like, for example, and that does not include a topic, and which is included in a manuscript image such as a receipt, a business card, and a list with the subject and stores that template. The HDD 17, for example, correlates a character string group such as "amount", "breakdown", "consumption tax" and the like with the subject "receipt", and stores that character string group as a template.

In this case, the control unit 10 compares a character string included in the document image with a template when the subject cannot be acquired using the above topic model, and in a case where a template is included in the characters string, outputs the subject correlated with the template.

Additionally, in the embodiments described above, the image portion is an image corresponding to a photograph; however, the technique according to the present disclosure is not limited to such an embodiment. The image portion is not particularly limited as long as the image portion does not include a character string and includes characteristics that can be recognized by the image recognition process, and may, for example, be an image corresponding to an illustration.

Furthermore, in the embodiments described above, the control unit 10 selectively executes acquisition of classification names using the first learning model or using the second learning model according to the result of the processing of step S12, step S22, step S26, or step S27; however, the technique according to the present disclosure is not limited to such an embodiment. For example, the control unit 10 may execute acquisition of classification names using the first learning model or classification names using the second learning model according to a user instruction inputted via the operation unit 16 indicating one of the acquisition methods.

Note that the present disclosure is not limited to the configurations of the embodiment described above, and various modifications are possible. For example, in the embodiments described above, a color multifunction device is used as an information processing apparatus; however, this is only an example, and another image forming apparatus such as a monochrome multifunction apparatus, a copier, or a facsimile apparatus, or the like, may be used, and a PC may also be used.

Moreover, the configuration and processing of the embodiment described above with reference to FIGS. 1 to 15 are merely one embodiment of the technique according to the present disclosure, and the technique according to the present disclosure is not intended to be limited to that configuration and processing.

In the typical technique described above, in a case where a character string is not included in the document image, it is not possible to generate a file name. In addition, even in a case where the document image includes a character string, it is not possible to generate a file name in a case where there is no frequently occurring character string or there is no character string that meets specified conditions.

With the technique according to the present disclosure, the user is able to acquire a file name corresponding to an image portion even in a case where an image indicated by an image file does not include a character portion. The user is also able to obtain a file name corresponding to a character portion even in a case where a character portion indicated by an image file does no include a character string that satisfies specified conditions.

What is claimed is:

1. An information processing apparatus comprising:
a storage unit that stores a first learning model that is trained in advance to output names according to characteristics of an inputted image, and a second learning model that is trained in advance to output names according to an inputted character string;
an image input unit to which an image file is inputted; and
a control unit that acquires a subject corresponding to an image indicated by the image file inputted via the image input unit and generates a file name including acquired subject as a file name of the image file;
wherein
in a case where an image indicated by the image file includes an image portion including a specified characteristic and does not include a character portion,
the control unit
uses the first learning model and acquires a name corresponding to the characteristic of the image portion as a subject;
in a case where an image indicated by the image file includes a character portion and does not include an image portion,
the control unit
uses the second learning model and acquires a name corresponding to a character string included in the character portion as a subject;
in a case where an image indicated by the image file includes the character portion and the image portion, a size of the character portion is larger than a size of the image portion, and a value indicating a difference between the size of the character portion and the size of the image portion is greater than a specified value,
the control unit
uses the second learning model and acquires a name corresponding to the character string included in the character portion as the subject; and
in a case where an image indicated by the image file includes the character portion and the image portion, and a size of the image portion is larger than a size of the character portion, and a value indicating a difference between the size of the image portion and the size of the character portion is greater than a specified value,
the control unit
uses the first learning model and acquires a name corresponding to the characteristic of the image portion as the subject.

2. The information processing apparatus according to claim 1, wherein
in a case where an image indicated by the image file includes a plurality of character portions and the acquired name is common among the plurality of character portions,
the control unit
acquires the common name as the subject; and
in a case where an image indicated by the image file includes a plurality of character portions and acquired name is not common among the plurality of character portions,
the control unit
acquires a character string that includes all of the name that are not common as the subject.

3. An information processing apparatus comprising:
a storage unit that stores a first learning model that is trained in advance to output names according to characteristics of an inputted image, and a second learning model that is trained in advance to output names according to an inputted character string;

an image input unit to which an image file is inputted; and a control unit that acquires a subject corresponding to an image indicated by the image file inputted via the image input unit and generates a file name including acquired subject as a file name of the image file; wherein in a case where an image indicated by the image file includes an image portion including a specified characteristic and does not include a character portion, the control unit uses the first learning model and acquires a name corresponding to the characteristic of the image portion as a subject;

in a case where an image indicated by the image file includes a character portion and does not include an image portion, the control unit uses the second learning model and acquires a name corresponding to a character string included in the character portion as a subject; and in a case where an image indicated by the image file includes the character portion and the image portion, and a value indicating the difference between a size of the character portion and a size of the image portion is equal to or less than a specified value, the control unit uses the second learning model and acquires a name corresponding to the character string included in the character portion as the subject.

4. An information processing apparatus comprising:

a storage unit that stores a first learning model that is trained in advance to output names according to characteristics of an inputted image, and a second learning model that is trained in advance to output names according to an inputted character string;

an image input unit to which an image file is inputted; and a control unit that acquires a subject corresponding to an image indicated by the image file inputted via the image input unit and generates a file name including acquired subject as a file name of the image file; wherein in a case where an image indicated by the image file includes an image portion including a specified characteristic and does not include a character portion, the control unit uses the first learning model and acquires a name corresponding to the characteristic of the image portion as a subject;

in a case where an image indicated by the image file includes a character portion and does not include an image portion, the control unit uses the second learning model and acquires a name corresponding to a character string included in the character portion as a subject; and in a case where an image indicated by the image file includes a plurality of image portions and acquired name is common among the plurality of image portions, the control unit acquires common name as the subject; and in a case where an image indicated by the image file includes a plurality of image portions and the acquired name is not common among the plurality of image portions, the control unit acquires a character string that includes all of the name that are not common as the subject.

* * * * *